(12) United States Patent
Ueki et al.

(10) Patent No.: US 8,373,539 B2
(45) Date of Patent: Feb. 12, 2013

(54) GAS CUTOFF APPARATUS

(75) Inventors: Kouichi Ueki, Nara (JP); Kazutaka Asano, Nara (JP); Takuhisa Ootani, Nara (JP); Yasuo Koba, Nara (JP); Shigeru Murakami, Nara (JP); Sumiko Murakami, legal representative, Nara (JP)

(73) Assignee: Panasonic Corporation, Osaka (JP)

( * ) Notice: Subject to any disclaimer, the term of this patent is extended or adjusted under 35 U.S.C. 154(b) by 653 days.

(21) Appl. No.: 12/668,749

(22) PCT Filed: Mar. 7, 2008

(86) PCT No.: PCT/JP2008/000497
§ 371 (c)(1),
(2), (4) Date: Jan. 12, 2010

(87) PCT Pub. No.: WO2009/008108
PCT Pub. Date: Jan. 15, 2009

(65) Prior Publication Data
US 2010/0219933 A1   Sep. 2, 2010

(30) Foreign Application Priority Data

Jul. 12, 2007 (JP) .................. 2007-182928

(51) Int. Cl.
*G05B 23/02* (2006.01)

(52) U.S. Cl. ......... 340/3.43; 340/626; 700/282; 700/79; 700/90; 700/275; 431/22; 48/194; 137/557; 137/487; 137/511; 137/486

(58) Field of Classification Search .................. 340/3.43; 48/194
See application file for complete search history.

(56) References Cited

FOREIGN PATENT DOCUMENTS

| JP | 62-198717 A | 9/1987 |
|---|---|---|
| JP | 04-119401 A | 4/1992 |
| JP | 05-067284 A | 3/1993 |
| JP | 07-044239 A | 2/1995 |
| JP | 07-151577 A | 6/1995 |
| JP | 09-126853 A | 5/1997 |

OTHER PUBLICATIONS

International Search Report for International Application No. PCT/JP2008/000497, dated Apr. 1, 2008, 2 pages.

*Primary Examiner* — Brian Zimmerman
*Assistant Examiner* — Sara Samson
(74) *Attorney, Agent, or Firm* — Brinks Hofer Gilson & Lione

(57) ABSTRACT

It is an objective to appropriately assure a function of limiting use of appliances that cause changes in quantities of gas used. There are provided a flow detection unit 10; a flow computing unit 11; an average flow computing unit 12; a flow storage unit 13 that records an average flow quantity value; a flow change determination unit 14 that determines whether there is a flow change; a flow registration unit 15 that registers a flow quantity corresponding to a flow change or deletes a registered flow quantity close to the flow change when the flow change determination unit 14 has determined an incremental or decremental change; a flow memory unit 16; a flow change correction memory unit 17 that, when the flow change determination unit has determined presence of a change and when only the maximum flow quantity is registered, determines whether or not a sum of registered flow quantities deleted in the past and an average flow fall within a predetermined range; a determination period unit 18 that, when no flow change is determined to have been for a predetermined time period, deletes flow quantities in the flow memory unit and the registered flow quantity, thereby performing re-registration; a monitoring value memory unit 19; an abnormality determination unit 20 that compares the flow quantity value in the flow registration unit with a determination value of the monitoring value memory unit, thereby determining presence or absence of an abnormality; and an operating time correction unit 22 that outputs a re-registration correction signal through use of a determination period unit.

9 Claims, 17 Drawing Sheets

GAS CUTOFF APPARATUS

TECHNICAL FIELD

The present invention relates to a gas cutoff apparatus and, more particularly, to a gas cutoff apparatus that prevents erroneous cutoff operation, which would otherwise be caused by an appliance usage restriction function even when a change has arisen in the used flow quantity because of flow control operation of an appliance itself.

BACKGROUND ART

A hitherto-disclosed, related art gas cutoff apparatus of this type has a flow measurement unit that outputs a flow signal conforming to the quantity of gas passed; an individual appliance estimation unit that estimates an increase or decrease in the number of individual appliances in operation when the flow signal is increased or decreased and that outputs an estimated individual computed flow quantity of an individual appliance caused the increase or decrease and a time during which the appliance has been used; an individual flow registration unit that previously registers the flow quantity of an individual appliance to be used and that outputs a registered individual flow quantity and a time during which the appliance has been used; an individual flow memory unit that stores the registered individual flow quantity; an abnormal flow determination section that outputs an individual abnormality signal when the estimated individual computed flow quantity of the appliance caused the increase or decrease is not included in the registered individual flow quantity stored in the individual flow memory unit and when a continual operating time of the appliance caused the increase or decrease is a first predetermined time or more; an alarm unit that reports an abnormality in the gas flow quantity by issuing an alarm upon receipt of the individual abnormality signal or a cutoff unit that cuts off a gas passageway upon receipt of the individual abnormality signal; and a regular individual flow registration unit that registers the estimated individual computed flow quantity generated by the individual flow estimation unit in the individual flow memory unit when the estimated, individual, computed flow quantity of the appliance generated by the individual appliance estimation unit is not included in the registered individual flow quantity stored in the individual flow memory unit and when an operating time of the appliance determined by the individual appliance estimation unit is longer than a second predetermined time and shorter than the first predetermined time (see; for instance, Patent Document 1).

The gas cutoff apparatus of Patent Document 1 is briefly described by reference to FIG. 17, and reference numeral 101 designates a flow measurement unit; namely, a flow sensor attached to a gas meter. Reference numeral 102 designates an individual appliance estimation unit and computes a flow signal "s" of a flow sensor 1 as an average flow for a given measurement period (30 seconds); estimates an increase or decrease in individual flow in use from an increase or decrease in average flow; and outputs an estimated individual computed flow Q of the appliance caused the increase or decrease and a time during which the appliance has been used. When the average flow quantity has increased, the individual appliance estimation unit 102 determines that a gas appliance conforming to the increase is used. In contrast, when the average flow quantity has decreased, the individual appliance estimation unit determines that the gas appliance conforming to the decrease is stopped and estimates an individual appliance in use. Reference numeral 103 designates an individual flow registration unit that is a setting device for previously inputting the flow quantity (Qi) of an individual appliance used in a household. Reference numeral 104 designates an individual flow memory unit that stores the flow quantity (Qi) of an individual appliance of the individual flow registration unit 103 and flow quantities in a regular individual flow registration unit 107 in sequence of Q1, Q2, Q3, . . . , Qn. Reference numeral 105 designates an abnormal flow determination section that outputs an individual abnormality signal E when the estimated individual flow quantity Q output from the individual appliance estimation unit 102 is not included in flow quantities [Q1, Q2, Q3, . . . , Qn] of the individual flow memory unit 104 and when the estimated individual flow quantity Q continues for a first predetermined time (10 minutes) or more. Reference numeral 106 designates an alarm unit or a cutoff unit equipped with an LCD or LED that reports an alarm upon receipt of the individual abnormality signal E or a cutoff valve that cuts off a gas passageway. Reference numeral 107 designates a regular individual flow registration unit that outputs the estimated individual flow quantity Q to the individual flow memory unit 104 when the estimated individual flow quantity Q output from the individual flow estimation unit 102 continues for period ranging from a second predetermined time (three minutes) to the first predetermined time (10 minutes).

Operation of the related art configuration will now be described. An average flow quantity is computed from a flow signal of the flow measurement unit 101. A flow change between the average flow quantity and the last average flow quantity but one is computed, to thus determine whether the change is an increase or a decrease. The estimated individual computed flow quantity Q is determined by means of corresponding processing. It is determined whether or not an estimated individual computed flow quantity Q newly determined as a result of increase processing or decrease processing is included in the individual flow memory unit 104 and whether or not the estimated individual appliance has been used for the first predetermined time (10 minutes). When the estimated individual computed flow is not included and when the estimated individual appliance is used for 10 minutes or more, the alarm unit or cutoff unit 106 is activated. When the estimated individual computed flow is not included or when the estimated individual appliance is not used for 10 minutes or more, it is determined whether or the flow quantity is an unregistered flow quantity; whether the estimated individual appliance is used for three minutes or more; and whether the estimated individual appliance is used for 10 minutes or less. When all of these conditions are satisfied, the regular individual flow registration unit 107 performs processing for registering the estimated individual appliance in the individual flow memory unit 104.

Provided that an increase Qt (e.g., Q2+Q3) has arisen in an average flow quantity as a result of simultaneous use of a plurality of appliances and that the appliances have been used for; for instance, seven minutes; namely, that the average flow quantity has decreased after elapse of seven minutes, the individual appliance estimation unit 102 outputs the estimated individual flow quantity Qt. When the time during which the appliances are used ranges from three minutes to 10 minutes, the regular individual flow registration unit 107 registers the estimated individual flow quantity Qt in the individual flow memory unit 104. Since the flow quantity of the appliances is registered in the individual flow memory unit 104, gas will not be cut off even when a similar flow quantity appears for 10 minutes or more from then on. Specifically, it is possible to diminish occurrence of erroneous cutoff of gas, which would otherwise be caused by gas appliances that are simultaneously started in many cases. Moreover, when a new individual flow quantity Qk (continued for a period ranging from three minutes to 10 minutes) is caused by a replacement appliance, the individual appliance estimation unit 102 outputs the estimated individual flow quantity Qk. When the replacement appliance is used for a period ranging from three minutes to 10 minutes, the regular individual flow registration unit 107 registers the estimated individual flow quantity Qk in the individual flow memory unit 104.

Since the flow quantity of the replacement appliance is registered in the individual flow memory unit 104, gas is not cut off even when the flow quantity has appeared for 10 minutes or more. Occurrence of an accident, which would otherwise be caused by an escape of gas attributable to a flow other than the flow quantities of the individual appliances, can be prevented by storing the individual appliances used in each household in advance. Thus, it is possible to prevent occurrence of erroneous cutoff of gas, which would otherwise be caused by simultaneous activation of appliances, use of a replacement appliance, or the like.

Patent Document 1: JP-A-7-44239

DISCLOSURE OF THE INVENTION

Problem that the Invention is to Solve

The related art configuration has a function of preventing occurrence of erroneous cutoff operation by cutting off a gas passageway when a flow other than the flow quantities registered in the individual flow memory unit is newly detected or newly registering the detected flow as a registered individual flow quantity. However, when use of an appliance registered in the form of a registered individual flow quantity is stopped while the flow quantity has changed within a normal range under flow control of the appliance itself, a resultant flow quantity assumes a value differing from the individual flow quantity achieved at the time of registration, and there arises a case where a different registered individual flow quantity will be erroneously deleted at the time of deletion of the registered individual flow quantity. In this case, if an appliance having a smaller registered individual flow quantity is deleted and if an appliance having a larger registered individual flow quantity is left, a time limit within which the appliance can continually be used will be shortened. A gas cutoff valve will be activated within a time period that is shorter than expected, whereupon a gas supply will be stopped. In contrast, if the appliance having a larger registered individual flow quantity is deleted and if the appliance having a smaller registered individual flow quantity is left, the continual use time limit will be prolonged, so that safety problem will arise when an appliance involving use of a large flow quantity is used, or the like.

There is a case where, in the case of use of; for instance, a shower, a hot water supply controls the gas flow quantity according to a temperature abnormality in order to keep hot water at a preset temperature, to thus vary the amount of combustion. Further, there is a case where a fan heater, or the like, varies the amount of combustion by controlling the gas flow quantity in order to keep constant room temperature. In such a case, there is a case where an estimated individual computed flow quantity, which has been determined by the individual appliance estimation unit at the time of initiation of use of the appliance and which is registered in the individual flow registration unit, differs from an initial estimated individual computed flow quantity with elapse of a time as a result of the gas flow quantity being gradually decreased under combustion level control corresponding to fluctuations in load. When use of any appliance is stopped or when a large change occurs in the flow quantity while a plurality of appliances are being used, the estimated individual computed flow quantities in the individual flow registration unit are usually re-registered in accordance with the amount of change. However, when the flow quantity gradually changes at a small rate of change as mentioned above, processing for re-registering estimated individual computed flow quantities is not performed. If processing for re-registering estimated individual computed flow quantities is performed at a timing of stoppage of use of any appliance or additional use of another appliance, actual flow quantities decreased under combustion level control, and the like, may differ from a total value of registered flow quantities. In such a case, a total value of registered flow quantities is monitored as being greater than the actual flow quantity, whereupon the appliance continual use time limit is shifted to a shorter time limit, to thus lead erroneous cutoff operation. In short, there is a problem of a failure to prevent occurrence of erroneous cutoff operation, which would otherwise be caused as a result of the total value of registered flow quantities being monitored while remaining different from the actual used flow quantity.

The present invention is to solve the problem and provides an erroneous-cutoff-free, highly safe gas cutoff apparatus that compares a registered individual flow quantity achieved by deletion of a predetermined registered individual flow quantity with an average flow quantity value determined by a flow computing unit when stoppage of use of an appliance is determined as a result of detection of a flow change of predetermined value or greater and that makes a correction to the registered individual flow quantity in accordance with difference data when there is a difference of predetermined level or larger, thereby making it possible to cause the registered individual flow quantity to approach an actual used flow quantity even in an operation mode in which the gas flow quantity gradually changes at a small rate of change.

The present invention is to solve the problem and provides an erroneous-cutoff-free, highly safe gas cutoff apparatus that performs processing for registering or deleting a registered individual flow quantity by detection of a flow change of predetermined level or more and that performs processing for making a correction to the registered individual flow quantity even in the case of a flow change of a predetermined level or less, thereby making it possible to cause the registered individual flow quantity to approach an actual used flow quantity even in an operation mode in which the gas flow quantity gradually changes at a small rate of change.

Means for Solving the Problem

In order to solve the related art problems, a gas cutoff apparatus of the present invention is equipped with: a flow detection unit 10 that measures a gas flow quantity; a flow computing unit 11 that computes a flow quantity value; an average flow computing unit 12 that determines an average flow quantity from a determined instantaneous flow quantity value; a flow storage unit 13 that stores the thus-determined average flow quantity value; a flow change determination unit 14 that determines whether or not there is a flow change from the flow quantity value obtained by the average flow computing unit 12 and the value stored in the flow storage unit 13; a flow registration unit 15 that registers a flow quantity corresponding to the flow change when the flow change determination unit 14 has determined an incremental change and that deletes a registered flow quantity close to the flow change when the flow change determination unit 14 has determined a decremental flow change; a flow memory unit 16 that records the registered flow quantity; a flow change correction memory unit 17 that, in a case where a plurality of flow quantities registered in the flow registration unit when the flow change determination unit has determined presence of a change are deleted and where only the maximum flow quantity is registered, determines whether or not a sum of the registered flow quantities deleted in the past and an average flow fall within a predetermined range; a determination period unit 18 that, when the plurality of flow quantities kept in the past and the average flow are determined to have undergone no flow change for a predetermined time period, deletes and performs re-registration of the plurality of flow quantities in the flow memory unit and the registered flow quantity; a monitoring value memory unit 19 that memories a determination value for monitoring an abnormality in an operating state; an abnormality determination unit 20 that compares the flow quantity value in the flow registration unit with the determination value of the monitoring value memory unit, thereby determining presence or absence of an abnormality; and an operating time correction unit 22 that outputs an operating time correction signal to the abnormality determination unit when the determination period unit performs re-registration.

According to the present invention, when a plurality of appliances are used and when flow quantities of the plurality of appliances are registered, the flow change determination unit determines that use of the plurality of appliances is stopped, and the flow registration unit deletes a corresponding plurality of flow quantities, whereupon the plurality of appliances are deemed to be a single appliance. When the registered flow quantity is in the vicinity of a total value of the flow quantities of the plurality of appliances deleted in the past (i.e., falls within a predetermined flow range), the determination period unit monitors a flow change for a predetermined period. When a flow change of predetermined level or more is not detected, the registered flow quantity is determined to be the flow quantities of the plurality of appliances deleted in the past. The registered flow quantity value is replaced with the plurality of flow quantities stored in the flow memory unit. It thereby becomes possible to prevent deterioration of ease of use, such as an increase in the number of operations of unnecessary dispatch of an engineer from the gas utility company, which would otherwise be caused when an operating time of a single appliance is erroneously monitored in spite of a plurality of appliances being actually used and when the gas supply is cut off earlier than an original operating time limit, and stoppage of the appliance in a short time period in spite of the appliance being originally capable of operating for a long time period, like a heating appliance. Further, a highly safe gas cutoff apparatus can be provided.

Further, in order to solve the drawback of the related art, a gas cutoff apparatus of the present invention is equipped with flow detection unit that measures a gas flow quantity; a flow computing unit that computes a flow quantity value from a detected value of the flow detection unit; an average flow computing unit that obtains an average flow quantity value by averaging instantaneous flow quantity values computed by the flow computing unit; a flow memory unit that stores the average flow quantity value obtained by the average flow computing unit; a flow change determination unit that determines presence of a flow change when a difference between the value obtained by the average flow computing unit and a value stored in the flow memory unit is larger than a preset first change value; a flow registration unit that registers or deletes a flow quantity corresponding to the flow change when the flow change determination unit has determined presence of a change; a registered flow determination unit that determines whether or not a flow quantity registered after processing of changing a registered flow quantity is normal; and a registered flow correction unit that corrects the registered flow quantity so as to become close to the average flow quantity value by use of a difference flow quantity when an abnormality is in the flow quantity registered after the processing of changing.

According to the present invention, when the flow change determination unit has detected a flow change of predetermined level or more, it is determined whether use of an appliance is started or stopped. When use of an appliance is started, the flow quantity corresponding to a flow change is registered, and the thus-registered flow quantity is set as a registered flow quantity corresponding to a limit for use of an appliance. When use of an appliance is stopped, a registered flow quantity close to the flow change is deleted, thereby setting a registered flow quantity as being close to an actual operating state. Further, it is determined whether or not the registered flow quantity acquired after deletion is a registered flow quantity conforming to operating appliances. When the registered flow quantity is determined not to conform to the operating appliances, a correction is made to the registered flow quantity in accordance with a difference flow quantity, thereby making the registered flow quantity close to a value conforming to the operating appliances. Therefore, even if another registered flow quantity is erroneously deleted when the flow quantity registered at the time of stoppage of use of the appliance is deleted, it is possible to make a correction to achieve a registered flow quantity corresponding to currently operating appliances. It is possible to provide a highly safe gas cutoff apparatus that can prevent occurrence of erroneous cutoff operation by assuring an appropriate operation limit function corresponding to an operating appliance.

In order to solve the drawback of the related art, a gas cutoff apparatus of the present invention includes: a flow detection unit that measures a gas flow quantity; a flow computing unit that computes a flow quantity value from a detected value of the flow detection unit; an average flow computing unit obtains an average flow quantity value by averaging, at each predetermined time, instantaneous flow quantity values computed by the flow computing unit; an average time clock unit that counts an averaging time; a flow memory unit that stores the average flow quantity value obtained by the average flow computing unit; a flow change determination unit that determines presence of a flow change when a difference between the value obtained by the average flow computing unit and a value stored in the flow memory unit is larger than a preset first change value; a flow registration unit that registers or deletes a flow quantity corresponding to the flow change in accordance with a direction of the change when the flow change determination unit determines that a change is present; a registered flow correction unit that makes a correction to a flow quantity value in the flow registration unit when a difference between a value obtained by the average flow computing unit and the value registered in the flow registration unit is smaller than the first change value and larger than a second change value; a monitoring value memory unit that memories a determination value for monitoring an abnormality in an operating state; an abnormality determination unit that compares the flow quantity value in the flow registration unit with a corresponding determination value in the monitoring value memory unit, thereby determining presence or absence of an abnormality; and a cutoff unit that cuts off a gas supply when the abnormality determination unit has made an abnormality determination.

According to the present invention, when the flow change determination unit has detected a flow change of predetermined level or more, it is determined whether use of an appliance is started or stopped. When use of an appliance is started, a flow quantity commensurate with the flow change is registered and set as a registered flow quantity value corresponding to a use limit on the appliance. When use of an appliance is stopped, a registered flow quantity close to the flow change is deleted, and the remaining registered flow quantity is set as being close to an actual operating state. When the flow change is small and cannot be detected by the flow change determination unit and when the flow change lies in a predetermined range, a correction is made to the registered flow quantity value by a value commensurate with the flow change. Therefore, even in a case where the gas flow quantity gradually changes at a small rate of change by proportional control, and the like, when the flow change falls within a predetermined range, a correction is made to the registered flow quantity each time, thereby enabling setting of a registered flow quantity conforming to the currently operating appliances. It is possible to provide a highly safe gas cutoff apparatus that can prevent occurrence of erroneous cutoff operation by assuring a use limit function appropriate to operating appliances.

In order to solve the drawback of the related art, a gas cutoff apparatus of the present invention includes: a flow detection unit that measures a gas flow quantity; a flow computing unit that computes a flow quantity value from a detected value of the flow detection unit; an average flow computing unit obtains an average flow quantity value by averaging, at each predetermined time, instantaneous flow quantity values computed by the flow computing unit; an average time clock unit that counts an averaging time; a flow memory unit that stores the average flow quantity value obtained by the average flow computing unit; a flow change determination unit that determines presence of a flow change when a difference between the value obtained by the average flow computing unit and a value stored in the flow memory unit is larger than a preset first change value; a flow registration unit that registers or deletes a flow quantity corresponding to the flow change in accordance with a direction of the change when the flow change determination unit determines that a change is present; a registered flow correction unit that makes a correction to a flow quantity value in the flow registration unit when a difference between a value obtained by the average flow computing unit and the value registered in the flow memory unit is smaller than the first change value and larger than a second change value; a monitoring value memory unit that memories a determination value for monitoring an abnormality in an operating state; an abnormality determination unit that compares the flow quantity value in the flow registration unit with a corresponding determination value in the monitoring value memory unit, thereby determining presence or absence of an abnormality; and a cutoff unit that cuts off a gas supply when the abnormality determination unit has made an abnormality determination.

According to the present invention, when the flow change determination unit has detected a flow change of predetermined level or more, it is determined whether use of an appliance is started or stopped. When use of an appliance is started, a flow quantity commensurate with the flow change is registered and set as a registered flow quantity value corresponding to a use limit on the appliance. When use of an appliance is stopped, a registered flow quantity close to the flow change is deleted, and the remaining registered flow quantity is set as being close to an actual operating state. When the flow change is small and cannot be detected by the flow change determination unit and when the flow change lies in a predetermined range, a correction is made to the registered flow quantity value by a value commensurate with the flow change. Therefore, even in a case where the gas flow quantity gradually changes at a small rate of change by proportional control, and the like, when the flow change falls within a predetermined range, a correction is made to the registered flow quantity each time, thereby enabling setting of a registered flow quantity conforming to the currently operating appliances. It is possible to provide a highly safe gas cutoff apparatus that can prevent occurrence of erroneous cutoff operation by assuring a use limit function appropriate to operating appliances.

Advantages of the Invention

In the gas cutoff apparatus of the present invention, when a plurality of appliances are used and when flow quantities of the plurality of appliances are registered, the flow change determination unit determines that use of the plurality of appliances is stopped, and the flow registration unit deletes a corresponding plurality of flow quantities, whereupon the plurality of appliances are deemed to be a single appliance. When the registered flow quantity is in the vicinity of a total value of the flow quantities of the plurality of appliances deleted in the past (i.e., falls within a predetermined flow range), the determination period unit monitors a flow change for a predetermined period. When a flow change of predetermined level or more is not detected, the registered flow quantity is determined to be the flow quantities of the plurality of appliances deleted in the past. The registered flow quantity value is replaced with the plurality of flow quantities stored in the flow memory unit. It thereby becomes possible to prevent deterioration of ease of use, such as an increase in the number of operations of unnecessary dispatch of an engineer from the gas utility company, which would otherwise be caused when an operating time of a single appliance is erroneously monitored in spite of a plurality of appliances being actually used and when the gas supply is cut off earlier than an original operating time limit, and stoppage of the appliance in a short time period in spite of the appliance being originally capable of operating for a long time period, like a heating appliance.

Moreover, in the gas cutoff apparatus of the present invention, when there is performed processing for deleting a registered flow quantity as a result of a flow change of predetermined level or more being detected and use of an appliance being determined to be stopped, it is determined whether or not the registered flow quantity acquired after deletion is a registered flow quantity conforming to operating appliances. When the registered flow quantity is determined not to conform to the operating appliances, a correction is made to the registered flow quantity in accordance with a difference flow quantity, thereby making the registered flow quantity close to a value conforming to the operating appliances. Therefore, even if another registered flow quantity is erroneously deleted when the flow quantity registered at the time of stoppage of use of the appliance is deleted, it is possible to make a correction to achieve a registered flow quantity corresponding to currently operating appliances. It is possible to provide a highly safe gas cutoff apparatus that can prevent occurrence of erroneous cutoff operation by assuring an appropriate operation limit function corresponding to an operating appliance.

Moreover, the gas cutoff apparatus of the present invention performs processing for newly registering or deleting a registered flow quantity by detection of a flow change of predetermined level or greater. Even when the flow change is of a predetermined value or less, there is performed processing for correcting the registered flow quantity. There is thereby provided a highly safe gas cutoff apparatus that is free of erroneous cutoff operation and that can make a registered flow quantity close to an actual used flow quantity even in a use arrangement in which the gas flow quantity gradually changes at a small rate of change.

The gas cutoff apparatus of the present invention performs processing for newly registering or deleting a registered flow quantity by detection of a flow change of predetermined level or greater. Even when the flow change is of a predetermined value or less, there is performed processing for correcting the registered flow quantity. There is thereby provided a highly safe gas cutoff apparatus that is free of erroneous cutoff operation and that can make a registered flow quantity close to an actual used flow quantity even in a use arrangement in which the gas flow quantity gradually changes at a small rate of change.

BRIEF DESCRIPTION OF THE DRAWINGS

(FIGS. 1 AND 2)

Figure 1:
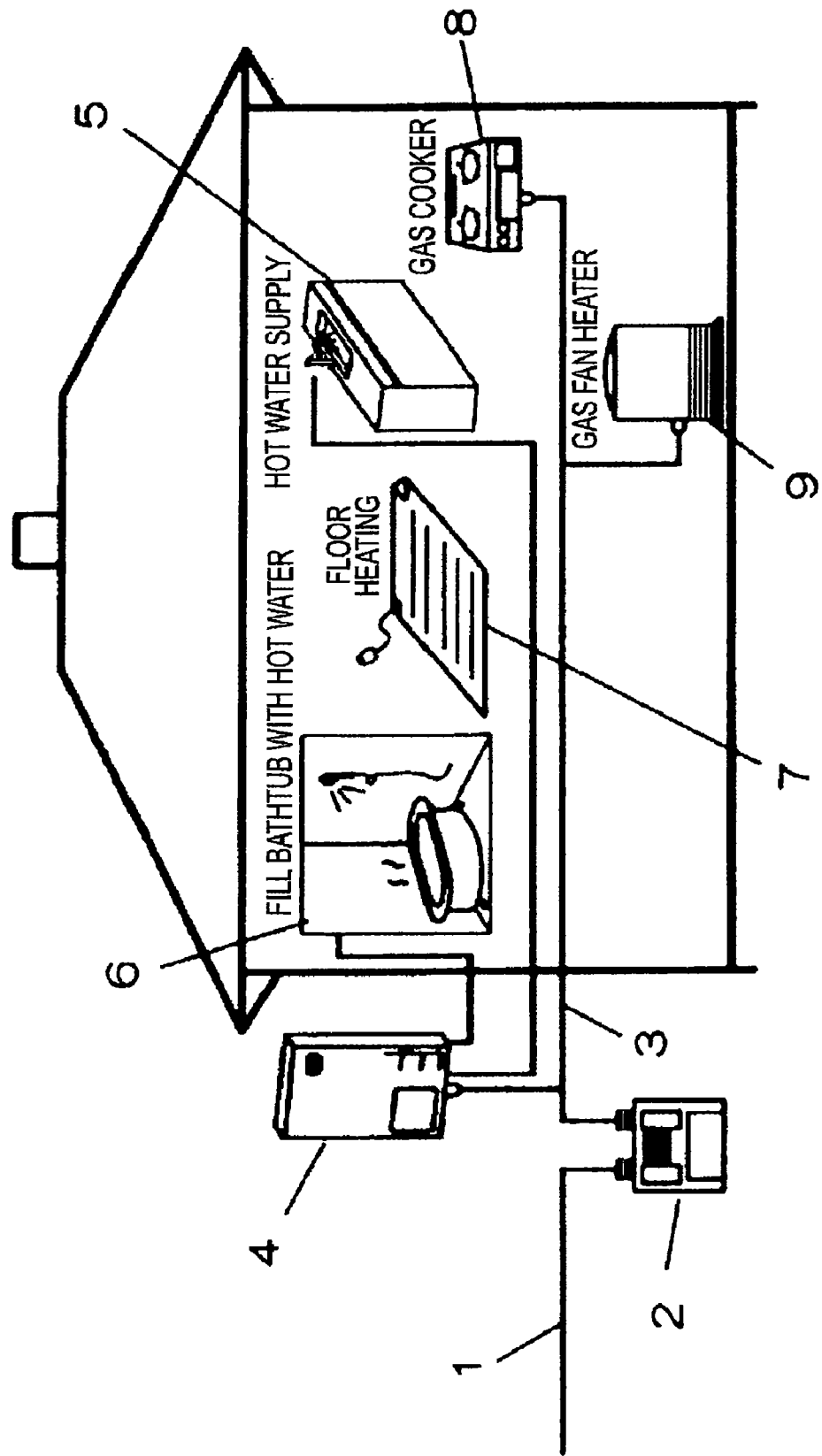
[FIG. 1] It is a view showing a mode of installation of a gas cutoff apparatus and a gas appliance of a first embodiment of the present invention.

10 FLOW DETECTION UNIT
11 FLOW COMPUTING UNIT
12 AVERAGE FLOW COMPUTING UNIT
13 FLOW CHANGE DETERMINATION UNIT
14 FLOW STORAGE UNIT
15 Flow Registration Unit
16 FLOW MEMORY UNIT
17 FLOW CHANGE CORRECTION MEMORY UNIT
18 DETERMINATION PERIOD UNIT
19 MONITORING VALUE MEMORY UNIT
20 ABNORMALITY DETERMINATION UNIT
21 CUTOFF UNIT
22 OPERATING TIME CORRECTION UNIT
(FIGS. 3 through 7)
2 GAS METER
11 GAS CUTOFF VALVE
12 AVERAGE FLOW COMPUTING UNIT
14 FLOW MEMORY UNIT
15 FLOW CHANGE DETECTION UNIT
16 FLOW REGISTRATION UNIT
17 FLOW DETECTION UNIT
19 FLOW COMPUTING UNIT
20 REGISTRATION FLOW DETERMINATION UNIT
21 REGISTERED FLOW CORRECTION UNIT
22 ABNORMALITY DETERMINATION UNIT
23 CUTOFF UNIT
24 CHANG DIRECTION DETERMINATION UNIT
25, 26 DIFFERENCE FLOW CALCULATION UNIT
(FIGS. 8 through 11)
2 GAS METER
11 GAS CUTOFF VALVE
12 AVERAGE FLOW COMPUTING UNIT
14 FLOW MEMORY UNIT
15 FLOW CHANGE DETECTION UNIT
16 FLOW REGISTRATION UNIT
17 FLOW DETECTION UNIT
19 FLOW COMPUTING UNIT
20 Changed Value Determination Unit
21 REGISTERED FLOW CORRECTION UNIT
22 ABNORMALITY DETERMINATION UNIT
23 CUTOFF UNIT
24 AVERAGE TIME CLOCKING UNIT
(FIGS. 12 through 16)
2 GAS METER
11 GAS CUTOFF VALVE
12 AVERAGE FLOW COMPUTING UNIT
14 FLOW MEMORY UNIT
15 FLOW CHANGE DETECTION UNIT
16 FLOW REGISTRATION UNIT
17 FLOW DETECTION UNIT
19 FLOW COMPUTING UNIT
20 REGISTRATION FLOW DETERMINATION UNIT
21 REGISTERED FLOW CORRECTION UNIT
22 ABNORMALITY DETERMINATION UNIT
23 CUTOFF UNIT
24 CHANGE DIRECTION DETERMINATION UNIT
25, 26 DIFFERENCE FLOW CALCULATION UNIT

BEST MODES FOR IMPLEMENTING THE INVENTION

A first invention is directed toward a gas cutoff apparatus that monitors operating conditions of a plurality of gas appliances connected to portions of a pipe extending from a gas meter and that cuts off a gas supply at the time of occurrence of an abnormality, the gas meter including: a flow detection unit that measures a gas flow quantity; a flow computing unit that computes a flow quantity value from a detected value of the flow detection unit; an average flow computing unit that obtains an average flow quantity value by averaging instantaneous flow quantity values computed by the flow computing unit; a flow storage unit that records the average flow quantity value obtained by the average flow computing unit; a flow change determination unit that determines presence of a flow change from the flow quantity value obtained by the average flow computing unit and a value stored in the flow storage unit when a flow change is larger than a predetermined change value; a flow registration unit that registers a flow quantity corresponding to the flow change when the flow change determination unit has determined an incremental change and that deletes a registered flow quantity close to the flow change when the flow change determination mans has detected a decremental change; a flow memory unit that stores a flow quantity registered in the flow registration unit; a flow change correction memory unit that, in a case where a plurality of flow quantities registered in the flow registration unit when the flow change determination unit has determined presence of a change are deleted and where only the maximum flow quantity is registered, determines whether or not a sum of the registered flow quantities deleted in the past and an average flow fall within a predetermined range; a determination period unit that, when the plurality of flow quantities kept in the past and the average flow are determined to have undergone no flow change for a predetermined time period by an output signal from the flow change correction memory unit, deletes and performs re-registration of the plurality of flow quantities in the flow memory unit and the registered flow quantity; a monitoring value memory unit that memories a determination value for monitoring an abnormality in an operating state; an abnormality determination unit that compares the flow quantity value in the flow registration unit with the determination value of the monitoring value memory unit, thereby determining presence or absence of an abnormality; an operating time correction unit that outputs an operating time correction signal to the abnormality determination unit when the determination period unit has performed re-registration; and a cutoff unit that cuts off a gas supply when the abnormality determination unit has made an abnormality determination.

When a plurality of appliances are used and when flow quantities of the plurality of appliances are registered, the flow change determination unit determines that use of the plurality of appliances is stopped, and the flow registration unit deletes a corresponding plurality of flow quantities, whereupon the plurality of appliances are deemed to be a single appliance. When the registered flow quantity is in the vicinity of a total value of the flow quantities of the plurality of appliances deleted in the past (i.e., falls within a predetermined flow range), the determination period unit monitors a flow change for a predetermined period. When a flow change of predetermined level or more is not detected, the registered flow quantity is determined to be the flow quantities of the plurality of appliances deleted in the past. The registered flow quantity value is replaced with the plurality of flow quantities stored in the flow memory unit. It thereby becomes possible to prevent deterioration of ease of use, such as an increase in the number of operations of unnecessary dispatch of an engineer from the gas utility company, which would otherwise be caused when an operating time of a single appliance is erroneously monitored in spite of a plurality of appliances being actually used and when the gas supply is cut off earlier than an original operating time limit, and stoppage of the appliance in a short time period in spite of the appliance being originally capable of operating for a long time period, like a heating appliance. Further, a high degree of safety is attained.

(First Embodiment)

Figure 2:
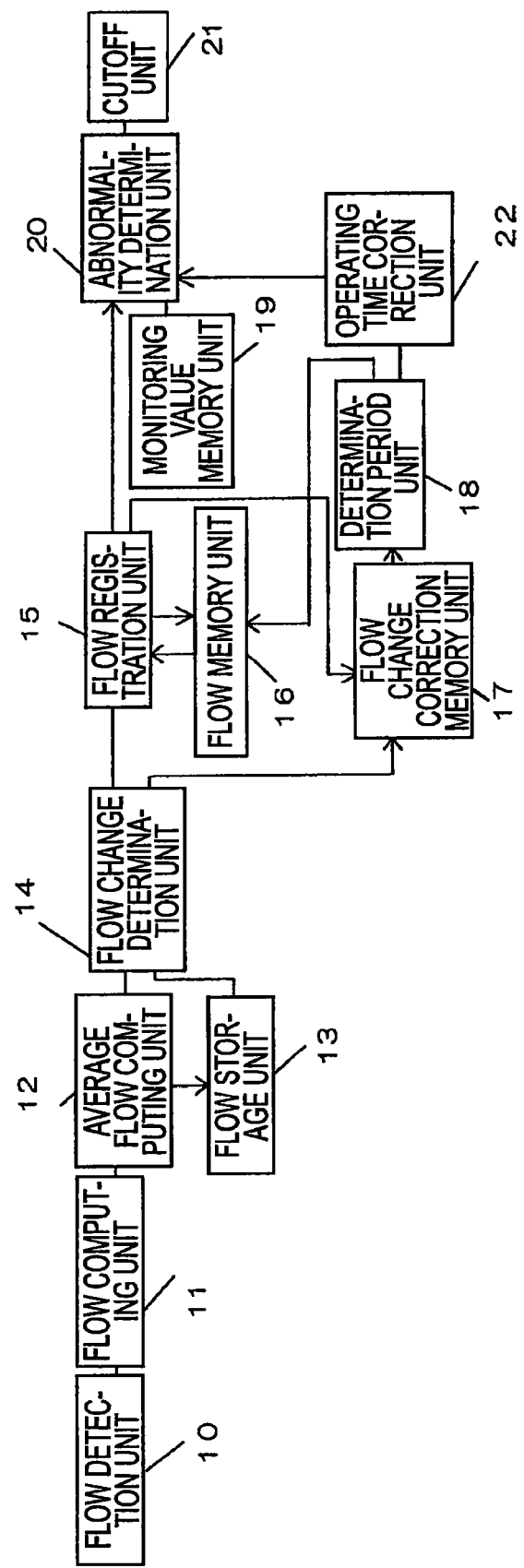
[FIG. 2] It is a control block diagram of the gas cutoff apparatus.

FIG. 1 is a view showing a mode of installation of a gas cutoff apparatus and gas appliances of a first embodiment of the present invention, and FIG. 2 is a control block diagram of the gas cutoff apparatus.

A gas meter 2 is installed at an entrance of a gas supply line 1 of an individual household. A gas pipe 3 extending from the gas meter 2 branches to locations where various gas appliances used in the household are installed, and gas is supplied by way of the pipe. For example, a gas hot water supply 4 is installed outdoors. Hot water produced by the gas hot water supply 4 is supplied, by way of a water pipe, to a hot water faucet 5 of a kitchen, a bathroom 6 where a bathtub or a shower unit is installed, a floor heating 7 set in a living room, and the like. Thus, various use arrangements are realized.

In the interior of a house, gas is supplied to a gas cooker 8 installed in the kitchen and a gas fan heater 9 set in the living room, a bedroom, and others. The gas appliances are used, as required, according to the circumstances.

When gas is consumed as a result of use of any of the thus-installed gas appliances, the gas meter 2 measures the quantity of gas used, and data are cumulatively kept every predetermined period. After subjected to predetermined information processing in accordance with a periodic data request command from a gas service provider, the data stored in the gas meter 2 is transmitted to customers and a gas utility company as information, such as a gas charge, the quantity of gas used, or discount service offered by the gas utility company.

A gas passageway having a gas inlet and a gas outlet is formed in the gas meter 2 and the gas passageway is made up of a flow detection unit 10 for measuring the gas flow quantity, a cutoff unit 21 for cutting off gas in case of occurrence of an abnormality in the gas passageway, and others. Various types are available for the flow detection unit 10. For instance, one type is to transmit an ultrasonic signal by a pair of ultrasonic sensors disposed in the passageway from one sensor to the other and detect the quantity of gas used in accordance with a propagation time consumed by transmission. Another type is to place a hot wire sensor in the passageway and determine the flow quantity from impedance that changes in accordance with a flow. Still another type is to detect the quantity of gas by a measurement membrane and convert mechanical action of the measurement membrane into an electric pulse signal by a magnet, a lead switch, or a magnetoresistance element, or the like, thereby detecting the flow quantity.

Accordingly, the flow detection unit 10 using an ultrasonic sensor is briefly descried. A first transceiver for transmitting or receiving an ultrasonic wave and a second transceiver for receiving or transmitting the same are disposed opposite each other along a direction of flow. The transceivers can be toggled between a transmission mode and a receiving mode by a control circuit and detect a flowing state of a fluid, such as gas. The flow quantity is measured by processing signals from the first transceiver and the second transceiver, and an ultrasonic wave is transmitted from an upstream position toward a downstream position. The second transceiver receives the thus-transmitted ultrasonic wave, and clock unit, such as a timer counter, measures a time.

Next, a switching unit transmits an ultrasonic signal from the downstream position toward the upstream position and measures a time value. In consideration of the size of the passageway and the flowing state of the fluid, a flow computing unit 11 determines a flow quantity value from a difference between a propagation time of the ultrasonic wave transmitted from the first transceiver and a propagation time of the ultrasonic wave transmitted from the second transceiver. Flow data are determined as an instantaneous flow quantity value at predetermined periods.

Instantaneous flow quantity values determined at predetermined periods are input to an average flow computing unit 12, where a predetermined number of instantaneous flow quantity values are aggregated and averaged, to thus be calculated as an average flow quantity value. The average flow quantity value is recorded in time sequence in a flow storage unit 13.

Specifically, a flow change determination unit 14 compares the average flow quantity value calculated this time by the average flow computing unit 12 with a flow quantity kept in the flow storage unit 13 last time or recorded N times before the current flow, thereby determining whether or not a change of predetermined value or more is present. Thus, it is determined whether or not use of an appliance is started or whether or not a change has arisen in the flow quantity. For instance, when the customer uses the hot water supply 4, the flow quantity value changes from zero to a predetermined flow quantity. Alternatively, when the hot water supply 4, or the like, is used in the course of use of another appliance, a determination is made, on the basis of the determined average flow and the flow quantity values kept in the flow storage unit 13 in the past, as to whether or not a rate of flow change or the amount of flow change is a predetermined level or greater, whereby it is determined as to whether the appliance is used or stopped or whether or not a change has arisen in the flow quantity.

When the flow change determination unit 14 detects a flow change, it is determined whether use of an appliance is started or stopped. Specifically, when an appliance is used, the amount of flow change is set as a registered flow quantity value in a flow registration unit 15. In this case, every time an incremental flow change is detected, an appliance is determined to be additionally used. The flow change is newly registered and set as a registered flow quantity value each time. On the contrary, when use of an appliance is stopped, an appliance assigned to a registered flow quantity value close to the flow change is determined to be stopped, and the registered flow quantity value among the flow quantity values registered in the flow registration unit 15 is deleted. Likewise, even in deletion processing, every time a decremental flow change is detected, use of an appliance is determined to be stopped, and processing for deleting a corresponding registered flow quantity value is performed each time. Further, the flow quantities of the appliances registered in the flow registration unit 15 are stored in time sequence in a flow memory unit 16. Even when the registered flow quantity is deleted by the flow registration unit 15, the flow quantity still remains in the flow memory unit 16.

Further, when the flow change determination unit 14 outputs a change existence signal, a flow change correction memory unit 17 determines whether the flow change is an incremental change or a decremental change and stores a result of determination. In particular, when flow quantities of a plurality of appliances (e.g., three or more appliances) are registered in the flow registration unit 15, when the plurality of flow quantities of the appliances (particularly small quantities of appliance flow) are deleted for reasons of a subsequent flow change, and when only one quantity of appliance flow is registered in the flow registration unit 15, the flow change correction memory unit 17 determines whether or not the registered flow quantity is substantially identical with the total flow quantity of the plurality of appliances deleted before a point of time of registration or whether or not a flow difference falls within a predetermined range of flow. When the flow difference falls within the predetermined range of flow, a monitoring signal is output to a determination period unit 18.

By an average flow quantity value and a total flow quantity values of a plurality of appliances kept in the flow memory unit 17, the determination period unit 18 monitors, for a predetermined period, whether or not a flow change has occurred at a timing at which the average flow quantity is determined. When a state of no flow change is continually recorded for the predetermined period, the flow memory unit 16 again registers the flow quantities of the plurality of appliances, which were erroneously deleted in spite of having been continually used in reality, in the registration flow determination unit 15 in decreasing order of flow from a large flow quantity to a small flow quantity.

An abnormality determination unit 20 monitors operating appliances in accordance with the thus-reset registered flow quantities. The abnormality determination unit 20 stores an appliance continual use time limit corresponding to a flow zone, a reference value for monitoring a value of the maximum used flow quantity, and the like. The abnormality determination unit 20 is provided with a monitoring value memory unit 19 having a preset total flow cutoff value for use in monitoring the state of an abnormally-large flow quantity, which would otherwise arise when a hose used for supplying gas to a space heater, and the like, is disconnected for any reason, and a preset operating time cutoff time limit for specifying an operating time limit for the case where an appliance is used for a much longer time period than the maximum period of operating time during which the appliance is usually used. The abnormality determination unit 20 compares the preset values with the registered flow quantity value in the flow registration unit 15, thereby determining whether or not the registered flow quantity value exceeds a value of the maximum used flow quantity, whether or not the appliance operating time exceeds an appliance continual use time limit corresponding to the registered flow quantity value, and the like. When detected an abnormality, the abnormality determination unit 20 sends a cutoff signal to a cutoff unit 21, thereby suspending a gas supply. A cutoff state and specifics of a cutoff state are displayed on a liquid-crystal display element, or the like, and also reported to a center that monitors the safety of gas through a communication unit, and the like.

Operation of the gas cutoff apparatus configured as mentioned above is now described. When gas appliances installed in the customer's house; for instance, the gas space heater 9, the hot water supply 4, and the like, are used, the flow detection unit 10 detects flow quantities of the appliances. When; for instance, an ultrasonic sensor, is used, a propagation time of an ultrasonic signal is measured as a detected value. The signal is sent to the flow computing unit 11, where the signal is calculated as an instantaneous flow quantity value. The average flow computing unit 12 computes an average flow quantity value from a predetermined number of instantaneous flow quantity values each time. A plurality of the thus-determined average flow quantities are periodically kept in time sequence in the flow storage unit 13. From flow quantities stored in the flow memory unit 14 in the past (e.g., the flow quantity kept last time, the flow quantity kept last but one, the flow quantity kept "n" times before, and the like), it is determined whether or not a flow change is present. Specifically, it is determined whether the appliance is used or stopped from the state of the change and by use of the average flow quantity value output at predetermined intervals. The amount of flow change acquired at the time of occurrence of the change is taken as a registered flow quantity for the operating appliance. The flow quantity is newly registered in the flow registration unit 15, or the already-registered flow quantities are deleted, whereby the registered flow quantities corresponding to the appliances operating at the point in time of occurrence of the change can be accurately set.

For instance, when the user uses the hot water supply 4, the flow quantity changes to an arbitrary flow level in a case where the flow quantity registered in the past is zero. The change is determined as a flow change from an average flow quantity and the flow quantity acquired in the past. When a rate of change or the amount of change is a predetermined level or more, the change is determined to be present; namely, an appliance of some kind is registered in the flow registration unit 15 as being currently used. Alternatively, when the hot water supply 4 is used in the course of use of the gas cooker 8, the flow quantity of the gas cooker 8 is recorded in the past flow quantity in the flow storage unit 13. The flow change determination unit 14 determines a flow change from the current average flow quantity and the flow quantity value kept in the past. Likewise, when a rate of change or the amount of change from the current flow quantity is a predetermined level or more, the change is determined to be present, and the flow change is registered in the flow registration unit 15. When any appliance is stopped in the course of use of a plurality of appliances or when a change arises in flow quantity, as well as when the number of appliances being used is increased, the flow change determination unit 15 determines, from the flow quantities kept in the past and the average flow quantity, whether or not the change is a decremental change, and outputs a decremental flow change. The flow registration unit 16 deletes or reduces a registered flow quantity value closest to the decremental flow change among the registered flow quantities.

However, in a mode in which the hot water supply 4 is used in the middle of the gas cooker 8 and the gas fan heater 9 being used; particularly, in which the hot water supply is used for floor heating, and the like, the amount of combustion greatly changes between when load exerted on the hot water supply in its early stage of operation is large and when load exerted on the hot water supply in its stable state is small. In such a case, the flow quantity of the gas cooker 8 and the flow quantity of the gas fan heater 9 are registered in the flow registration unit 15, and the flow quantity of the hot water supply 4 is also registered. In the early stage of operation of the hot water supply 4, a flow change is determined to be present, and use of the hot water supply 4 is determined. An average flow quantity value achieved at this point in time is registered in the flow registration unit 15 as a registered flow quantity. When operation is continually carried out, heating load is gradually decreased, whereupon the amount of combustion or the gas flow quantity is controlled in a decreasing manner by proportional control. There arises a case where the flow change determination unit 14 deletes the registered flow quantities of the gas cooker 8 and the gas fan heater 9 because of the amount of change achieved at this time in spite of the gas cooker and the gas fan heater being actually used. Further, when the use of the hot water supply 4 is stopped, the total flow quantity of the gas cooker 8 and the gas fan heater 9 is often left as the flow quantity of a single appliance in the flow registration unit 15.

Specifically, there is a case where the amount of flow change equal to a change in the flow quantities of the gas cooker 8 and the gas fan heater 9 occurs in the flow quantity of the hot water supply 4 during the course of use of the hot water supply. As a consequence, the gas cooker 8 and the gas fan heater 9 are determined to be stopped, and the registered flow quantity value is deleted from the flow registration unit 15. When the hot water supply 4 is stopped as a result of the heating load being saturated in this state, the flow change determination unit 15 determines that a flow change is present. The amount of flow change achieved at this time is deleted from the flow quantity registered in the flow registration unit 15. However, when the hot water supply 4 is stopped, the flow quantities of the gas cooker 8 and the gas fan heater 9 are already deleted. Therefore, the total flow quantity is left as the flow quantity of one appliance in the flow registration unit 15. The registered flow quantity acts as the flow quantity of one appliance that is not actually used, and the abnormality determination unit 20 uses the registered flow quantity as an object of comparison when performing a comparison with the preset value of the monitoring value memory unit 19.

Specifically, the operating appliances are monitored by the registered flow quantities that are greater in value than the flow quantities of the actually-operating appliances. The continual use time limit is shortened, so that the cutoff unit 21 is erroneously operated within an unexpected short time period. Thus, ease of use of the gas cutoff apparatus is deteriorated.

For these reasons, every time the flow quantity of for instance, an appliance A, and the flow quantity of; for instance, an appliance B, are registered in the flow registration unit 15, the thus-registered flow quantities are stored in time sequence in the flow memory unit 16. An appliance C involving the largest flow quantity; for instance, the hot water supply 4, is used and registered. Subsequently, when the flow quantities of the plurality of registered appliances; namely, the appliance A and the appliance B, are deleted as a result of occurrence of a flow change, deletion of the appliance A and the appliance B being performed for reasons of a flow change is stored in the flow change correction memory unit 17. Moreover, when the appliance C; namely, the hot water supply 4, is stopped, the flow quantity is left in the flow registration unit 15 as if the flow quantity of only one appliance were left. The flow change correction memory unit 17 compares the total flow quantity of the appliance A and the appliance B deleted as a result of a decrease in the flow quantities of the appliances with the remaining, registered flow quantity. When they are substantially equal to each other; namely, when the difference in flow quantity, falls within a range of predetermined value or a predetermined proportion, a monitoring signal is output to the determination period unit 18. The determination period unit 18 monitors, for a predetermined period, whether or not a flow change is present in the average flow quantity obtained by the average flow computing unit 11 as compared with the values registered in the flow registration unit 15 and the total flow quantity of the appliance A and the appliance B left in the flow memory unit 16. When a monitoring result shows no flow change in the predetermined period, the appliance whose flow quantity is registered is determined not to be actually one appliance, and a plurality of appliances have originally been continually used. The flow quantity registered in the flow registration unit 15 is re-registered as flow quantities of the plurality of appliances left in the flow memory unit 16. In short, registration of flow quantities is reset in agreement with the currently operating appliances by the flow quantity stored in the flow memory unit. Further, the determination period unit 18 can arbitrarily, freely change a period according to an actual use arrangement of each customer (i.e., a period of zero is also possible).

The abnormality determination unit 20 monitors operating conditions of the appliances through use of the thus-reset flow quantities and by reference to a corresponding an operating time cutoff time limit in the monitoring value memory unit 19. Since a determination time has already elapsed in the period determination unit 18, the operating time correction unit 22 subtracts the time elapsed in the determination period unit 18 from the operating time, and the thus-corrected operating time is output to the abnormality determination unit 20 to perform monitoring. When the monitoring time has elapsed or when an abnormality has happened, the cutoff unit 21 is activated to interrupt a gas supply, whereby safety is ensured.

The numerical limitations employed in the present embodiment are a mere example, and the use arrangement is not limited to the present embodiment either.

As mentioned above, when the flow change determination unit 14 has detected a flow change of predetermined level or larger, a change in flow quantity of an appliance is determined. When the flow change correction memory unit 17 detects that flow quantities of a plurality of appliances are deleted in the middle of use of an appliance involving the maximum flow quantity (i.e., in the middle of registration of the appliances in the flow registration unit 15) and when a change has occurred in the registered value of the maximum flow quantity, it is determined whether or not the plurality of originally-registered appliances are continually being used. When a flow change does not appear in a predetermined period, the appliances assigned to the deleted flow quantities are determined to be continually used, and the appliances are again registered in the flow registration unit 15. Accordingly, it is possible to correct the registered flow quantity in agreement with the currently operating appliance. It is possible to provide a gas cutoff apparatus with superior ease of use that can prevent occurrence of erroneous cutoff operation by assuring an operation limit function appropriate to the operating appliances.

A third invention is directed toward a gas cutoff apparatus that monitors operating conditions of a plurality of gas appliances connected to portions of a pipe extending from a gas meter and that cuts off a gas supply at the time of occurrence of an abnormality, the gas meter including: a flow detection unit that measures a gas flow quantity; a flow computing unit that computes a flow quantity value from a detected value of the flow detection unit; an average flow computing unit that obtains an average flow quantity value by averaging instantaneous flow quantity values computed by the flow computing unit; a flow memory unit that stores the average flow quantity value obtained by the average flow computing unit; a flow change determination unit that determines presence of a flow change when a difference between the value obtained by the average flow computing unit and a value stored in the flow memory unit is larger than a preset first change value; a flow registration unit that registers or deletes a flow quantity corresponding to the flow change when the flow change determination unit has determined presence of a change; a registered flow determination unit that determines whether or not a flow quantity registered after processing of changing a registered flow quantity is normal; and a registered flow correction unit that corrects the registered flow quantity so as to become close to the average flow quantity value by use of a difference flow quantity when an abnormality is in the flow quantity registered after the processing of changing.

When the flow change determination unit has detected a flow change of predetermined level or more, it is determined whether use of an appliance is started or stopped. When use of an appliance is started, the flow quantity corresponding to a flow change is registered, and the thus-registered flow quantity is set as a registered flow quantity corresponding to a limit for use of an appliance. When use of an appliance is stopped, a registered flow quantity close to the flow change is deleted, thereby setting a registered flow quantity as being close to an actual operating state. Further, it is determined whether or not the registered flow quantity acquired after deletion is a registered flow quantity conforming to operating appliances. When the registered flow quantity is determined not to conform to the operating appliances, a correction is made to the registered flow quantity in accordance with a difference flow quantity, thereby making the registered flow quantity close to a value conforming to the operating appliances. Therefore, even if another registered flow quantity is erroneously deleted when the flow quantity registered at the time of stoppage of use of the appliance is deleted, it is possible to make a correction to achieve a registered flow quantity corresponding to currently operating appliances. It is possible to provide a highly safe gas cutoff apparatus that can prevent occurrence of erroneous cutoff operation by assuring an appropriate operation limit function corresponding to an operating appliance.

A fourth invention is directed toward a gas cutoff apparatus that monitors operating conditions of a plurality of gas appliances connected to portions of a pipe extending from a gas meter and that cuts off a gas supply at the time of occurrence of an abnormality, the gas meter including: a flow detection unit that measures a gas flow quantity; a flow computing unit that computes a flow quantity value from a detected value of the flow detection unit; an average flow computing unit that obtains an average flow quantity value by averaging instantaneous flow quantity values computed by the flow computing unit; a flow memory unit that stores the average flow quantity value obtained by the average flow computing unit; a flow change determination unit that determines presence of a flow change when a difference between the value obtained by the average flow computing unit and a value stored in the flow memory unit is larger than a preset first change value; a change direction determination unit that outputs a registration signal or a deletion signal in accordance with a direction of a change when the flow change determination unit determines presence of a change; a flow registration unit that registers a flow quantity corresponding to the flow change when an output from the change direction determination unit is an incremental change and that deletes a flow quantity close to the flow change when the output is a decremental change; a registered flow determination unit that performs processing for subtracting the value obtained by the average flow computing unit from a value of a total flow quantity of the flow registration unit when the flow registration unit has performed deletion processing and that outputs an abnormality signal when there is a difference of predetermined level or more; a flow difference correction estimation unit that makes a correction to a value registered in the flow registration unit by use of the difference flow quantity upon receipt of the abnormality signal from the registered flow determination unit; a monitoring value memory unit that memories a determination value for monitoring an abnormality in an operating state; an abnormality determination unit that compares the flow quantity value in the flow registration unit with a corresponding determination value in the monitoring value memory unit, thereby determining presence or absence of an abnormality; and a cutoff unit that cuts off a gas supply when the abnormality determination unit has made an abnormality determination.

When the flow change determination unit has detected a flow change of predetermined level or more, it is determined whether the flow change is an incremental change or a decremental change, thereby determining whether use of an appliance is started or stopped. When use of an appliance is started, a registration signal is output, and the flow quantity corresponding to a flow change is newly registered, and the thus-registered flow quantity is set as a registered flow quantity corresponding to a limit for use of an appliance. When use of an appliance is stopped, a deletion signal is output, and a registered flow quantity close to the flow change is deleted, thereby setting a registered flow quantity as being close to an actual operating state. It is determined whether or not the registered flow quantity acquired after deletion is a registered flow quantity conforming to operating appliances. When the registered flow quantity is determined not to conform to the operating appliances, a correction is made to the registered flow quantity in accordance with a difference flow quantity calculated by the difference flow calculation unit, thereby making the registered flow quantity close to a value conforming to the operating appliances. Therefore, even if another registered flow quantity is erroneously deleted when the flow quantity registered at the time of stoppage of use of the appliance is deleted, it is possible to make a correction to achieve a registered flow quantity corresponding to currently operating appliances. Moreover, even when processing for deleting a registered flow quantity is performed while the used flow quantity at the time of stoppage of use of the appliance is reduced through combustion control, and the like, the registered flow quantity can be corrected by use of a difference flow quantity caused by the decrease. The flow quantity can be reset as a registered flow quantity close to that achieved in an actual operating state. It is possible to provide a highly safe gas cutoff apparatus that can prevent occurrence of erroneous cutoff operation by assuring an appropriate operation limit function corresponding to an operating appliance.

(Second Embodiment)

Figure 3:
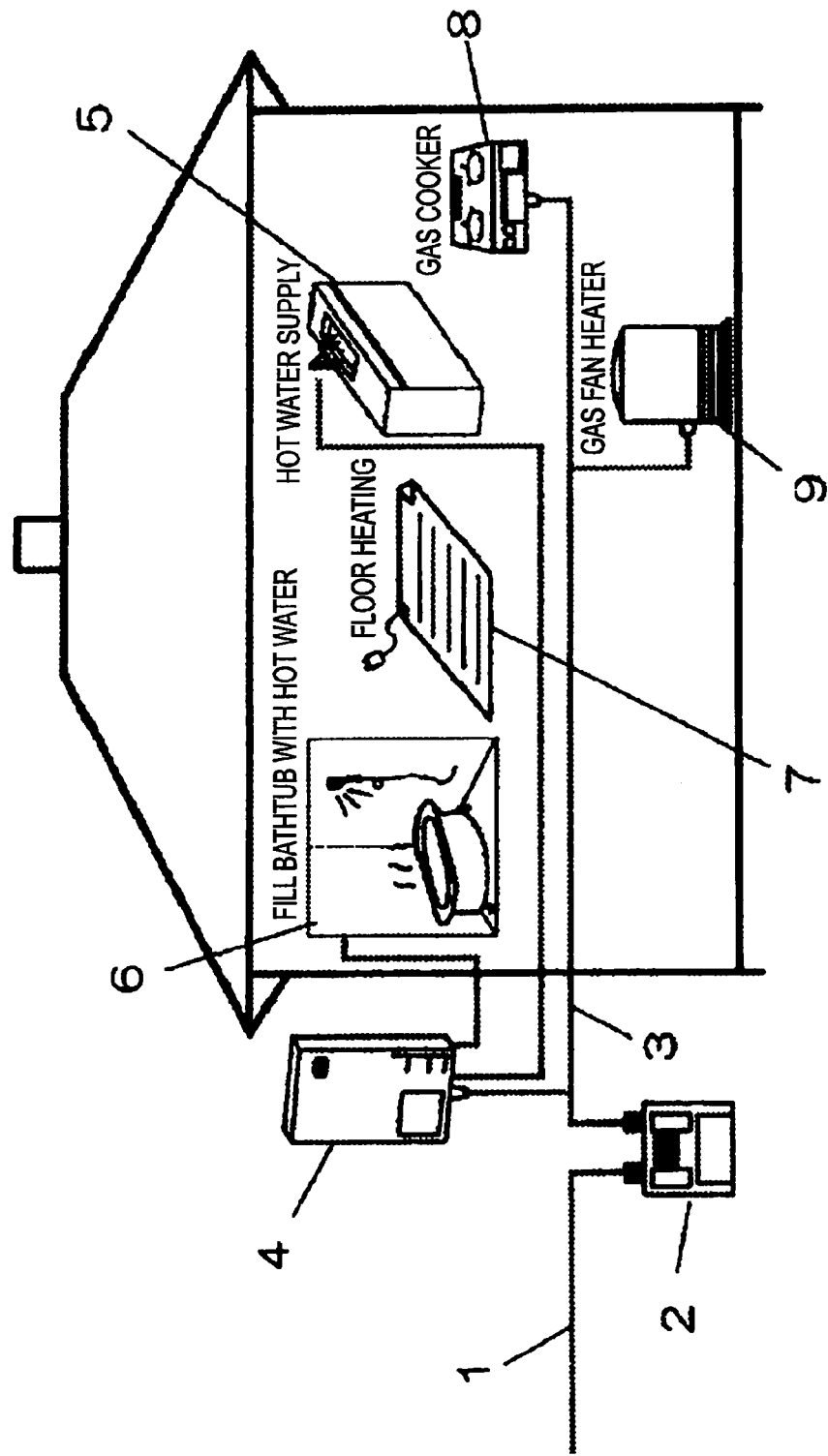
[FIG. 3] It is a view showing a mode of installation of a gas cutoff apparatus and a gas appliance of a second embodiment of the present invention.
Figure 4:
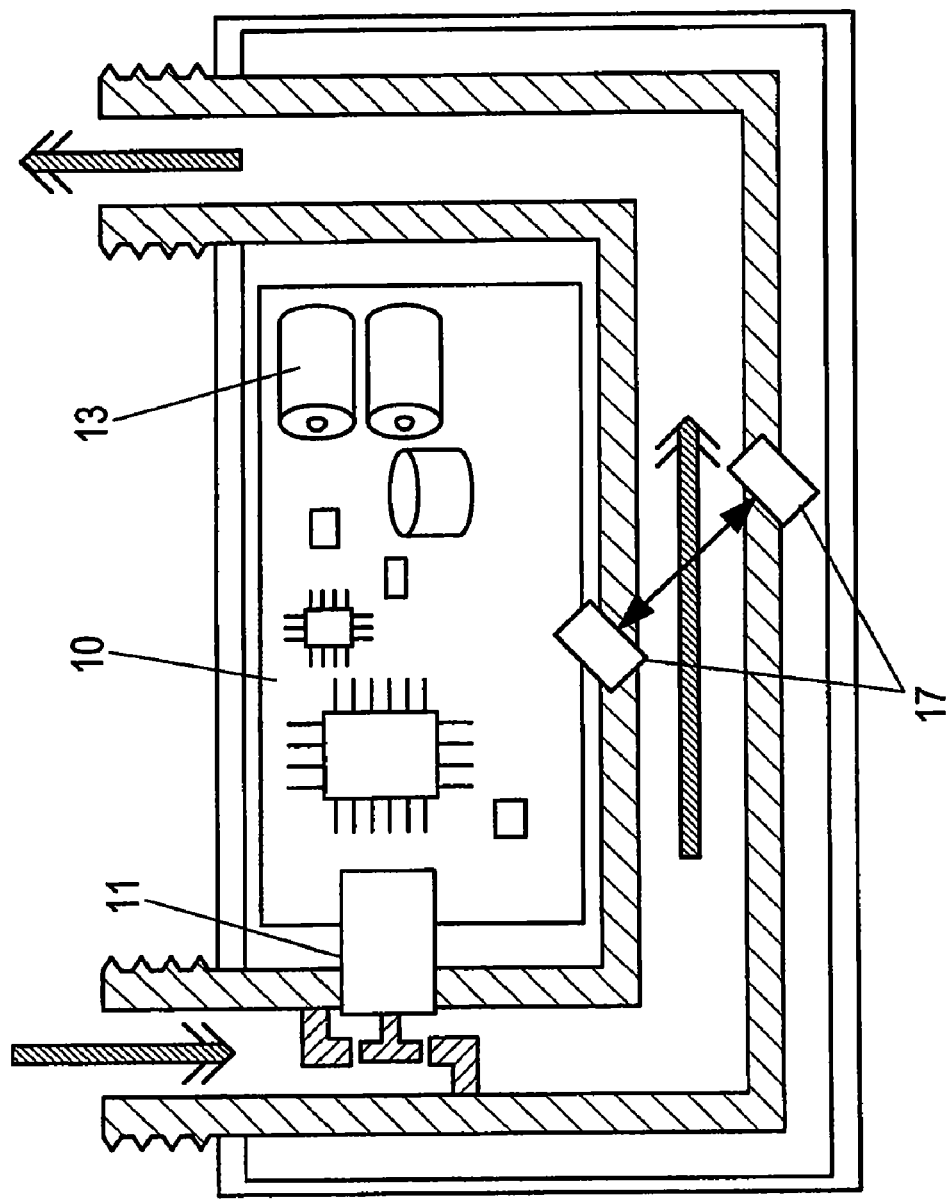
[FIG. 4] It is an internal schematic diagram of the gas cutoff apparatus.
Figure 5:
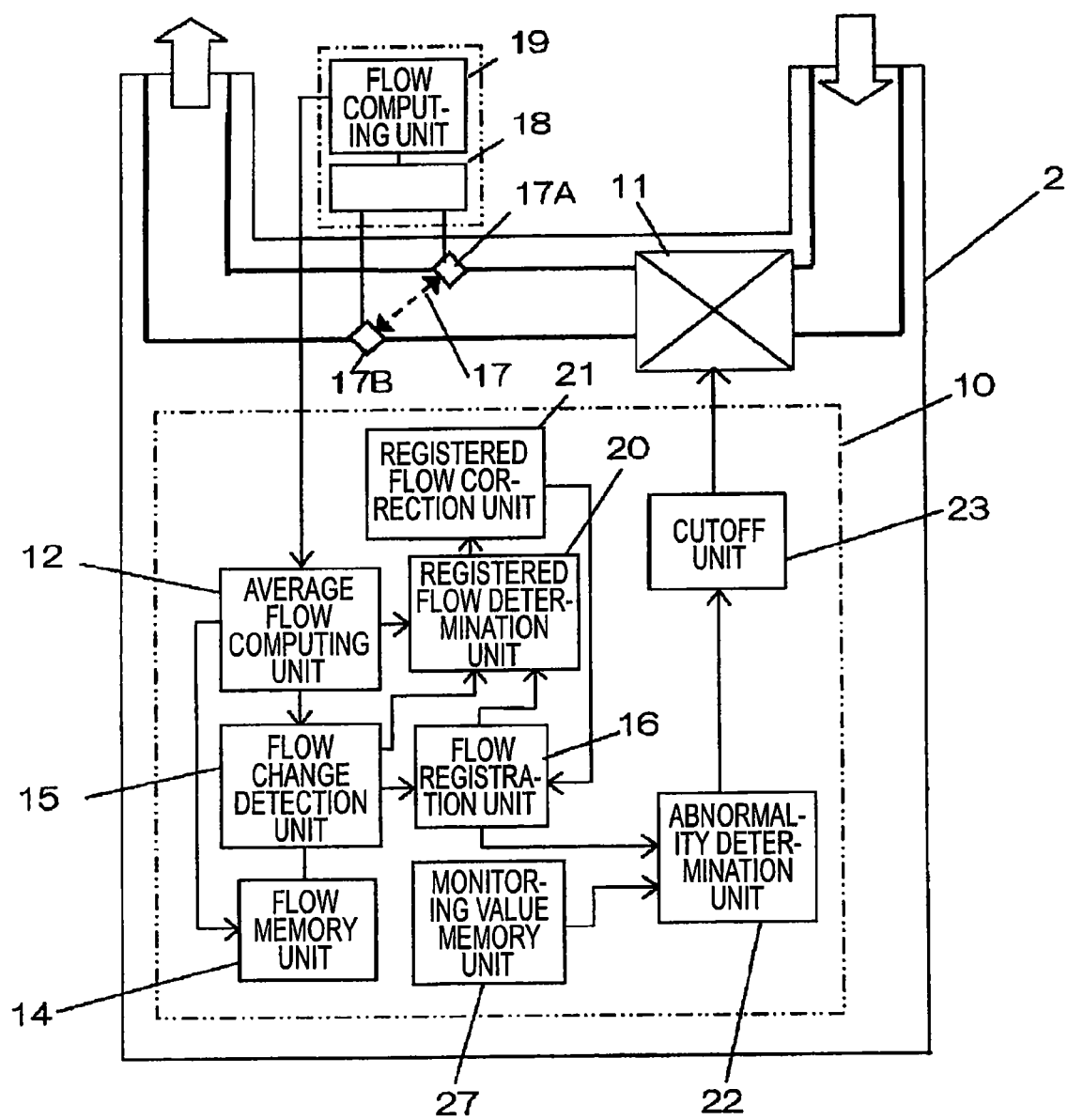
[FIG. 5] It is a control block diagram of the gas cutoff apparatus.

FIG. 3 is a view showing a mode of installation of a gas cutoff apparatus and gas appliances of a second embodiment of the present invention, FIG. 4 is an internal schematic diagram of the gas cutoff apparatus, and FIG. 5 is a control block diagram of the gas cutoff apparatus.

The gas meter 2 is installed at an entrance of a gas supply line 1 of an individual household. The gas pipe 3 extending from the gas meter 2 branches to locations where various gas appliances used in the household are installed, and gas is supplied by way of the pipe. For example, the gas hot water supply 4 is installed outdoors. Hot water produced by the gas hot water supply 4 is supplied, by way of a water pipe, to the hot water faucet 5 of a kitchen, a bathroom 6 where a bathtub or a shower unit is installed, a floor heating 7 set in a living room, and the like. Thus, various use arrangements are realized.

In the interior of a house, gas is supplied to the gas cooker 8 installed in the kitchen and the gas fan heater 9 set in the living room, a bedroom, and others. The gas appliances are used, as required, according to the circumstances.

When gas is consumed as a result of use of any of the thus-installed gas appliances, the gas meter 2 measures the quantity of gas used, and data are cumulatively kept every predetermined period. After subjected to predetermined information processing in accordance with a periodic data request command from a gas service provider, the data stored in the gas meter 2 is transmitted to customers and a gas utility company as information, such as a gas charge, the quantity of gas used, or discount service offered by the gas utility company.

A gas passageway having a gas inlet and a gas outlet is formed in the gas meter 2. Disposed in the gas passageway are a cutoff valve 11 for cutting off gas in case of an abnormality and a pair of ultrasonic sensors 17a and 17b serving as a flow detection unit 17 for measuring the gas flow quantity. Further, the gas meter has a built-in control circuit 10 made up of a flow computing unit 19 that computes the gas flow quantity from a signal from the flow detection unit 17 and an average flow computing unit 12 that aggregates the thus-computed instantaneous flow quantity value a predetermined number of times, to thus compute an average flow quantity value. Further, the gas meter houses a battery 13 for driving the control circuit 10.

Various types are available for the flow detection unit. For instance, one type is to transmit an ultrasonic signal by a pair of ultrasonic sensors disposed in the passageway described in connection with the present embodiment from one sensor to the other and detect the quantity of gas used in accordance with a propagation time consumed by transmission. Another type is to place a hot wire sensor in the passageway and determine the flow quantity from impedance that changes in accordance with a flow. Still another type is to detect the quantity of gas by a measurement membrane and convert mechanical action of the measurement membrane into an electric pulse signal by a magnet, a lead switch, or a magnetoresistance element, or the like, thereby detecting the flow quantity. A gas meter adopting a gas cutoff apparatus using an ultrasonic sensor as a flow detection unit is described in connection with the present embodiment.

Accordingly, the flow detection unit 17 using the ultrasonic sensors 17a and 17b is first, briefly descried. A first transceiver 17A for transmitting or receiving an ultrasonic wave and a second transceiver 17B for receiving or transmitting the same are disposed along a direction of flow. The transceivers can be toggled between a transmission mode and a receiving mode by a measurement control section 18 having a switching unit making up the control circuit 10, and a flowing state of a fluid, such as gas, is detected. The flow quantity is measured by processing signals from the first transceiver 17A and the second transceiver 17B. Specifically, the measurement control section 18 first drives the first transceiver 17A, thereby transmitting an ultrasonic wave toward the second transceiver 17B; namely, from an upstream position toward a downstream position. A signal received by the second transceiver 17B is amplified by an amplifying unit provided in the measurement control section 18. The thus-amplified signal is compared with a reference signal. After detection of a signal that is the reference signal or more, the transmission and receiving operations mentioned above are repeated a predetermined number of times by a repetition unit provided in the measurement control section 18. Resultant time values are respectively measured by a clock unit, such as a timer counter, provided in the measurement control section 18.

The measurement control section 18 having the switching unit toggles between the transmission operation of the first transceiver 17A and the receiving operation of the second transceiver 17B, thereby transmitting an ultrasonic signal from the second transceiver 17B toward the first transceiver 17A; namely, from the downstream position toward the upstream position. Transmission is iterated as mentioned previously, and resultant time values are respectively measured. In consideration of the size of the passageway and the flowing state of a fluid, a signal processing unit 19 making up the flow computing unit determines a flow quantity value from a difference between the propagation time of the ultrasonic wave from the first transceiver 17A and the propagation time of the ultrasonic wave from the second transceiver 17B. Flow data are determined at predetermined periods as an instantaneous flow quantity value.

Instantaneous flow quantity values determined at predetermined periods are input to the average flow computing unit 12, where a predetermined number of instantaneous flow quantity values are aggregated and averaged, to thus be calculated as an average flow quantity value. The average flow quantity value is recorded in time sequence in a flow memory unit 14. A flow change detection unit 15 compares the thus-kept average flow quantity value with the average flow quantity value calculated by the average flow computing unit 12, thereby determining whether or not a change of predetermined value or more is present. Thus, it is determined whether or not use of an appliance is started. For instance, when the customer uses the hot water supply 4, the flow quantity value changes from zero to a predetermined flow quantity. Alternatively, when the hot water supply 4, or the like, is used in the course of use of another appliance, a determination is made, on the basis of the determined average flow and the flow quantity values kept in the past, as to whether or not a rate of flow change or the amount of flow change is a predetermined level or greater, whereby it is determined whether the appliance is used or stopped.

When the flow change detection unit 15 detects a change value of predetermined level or more, an appliance is determined to be used or stopped. Specifically, when an appliance is used, the amount of flow change is registered in a flow registration unit 16, to thus be set as a registered flow quantity value. In this case, every time an incremental flow change is detected, an appliance is determined to be additionally used. The flow change is newly registered and set as a registered flow quantity value each time. On the contrary, when use of an appliance is stopped, a registered flow quantity value close to the flow change among the flow quantity values registered in the flow registration unit 16 is deleted. Likewise, even in deletion processing, every time a decremental flow change is detected, use of an appliance is determined to be stopped, and processing for deleting a corresponding registered flow quantity value is performed each time.

Figure 6:
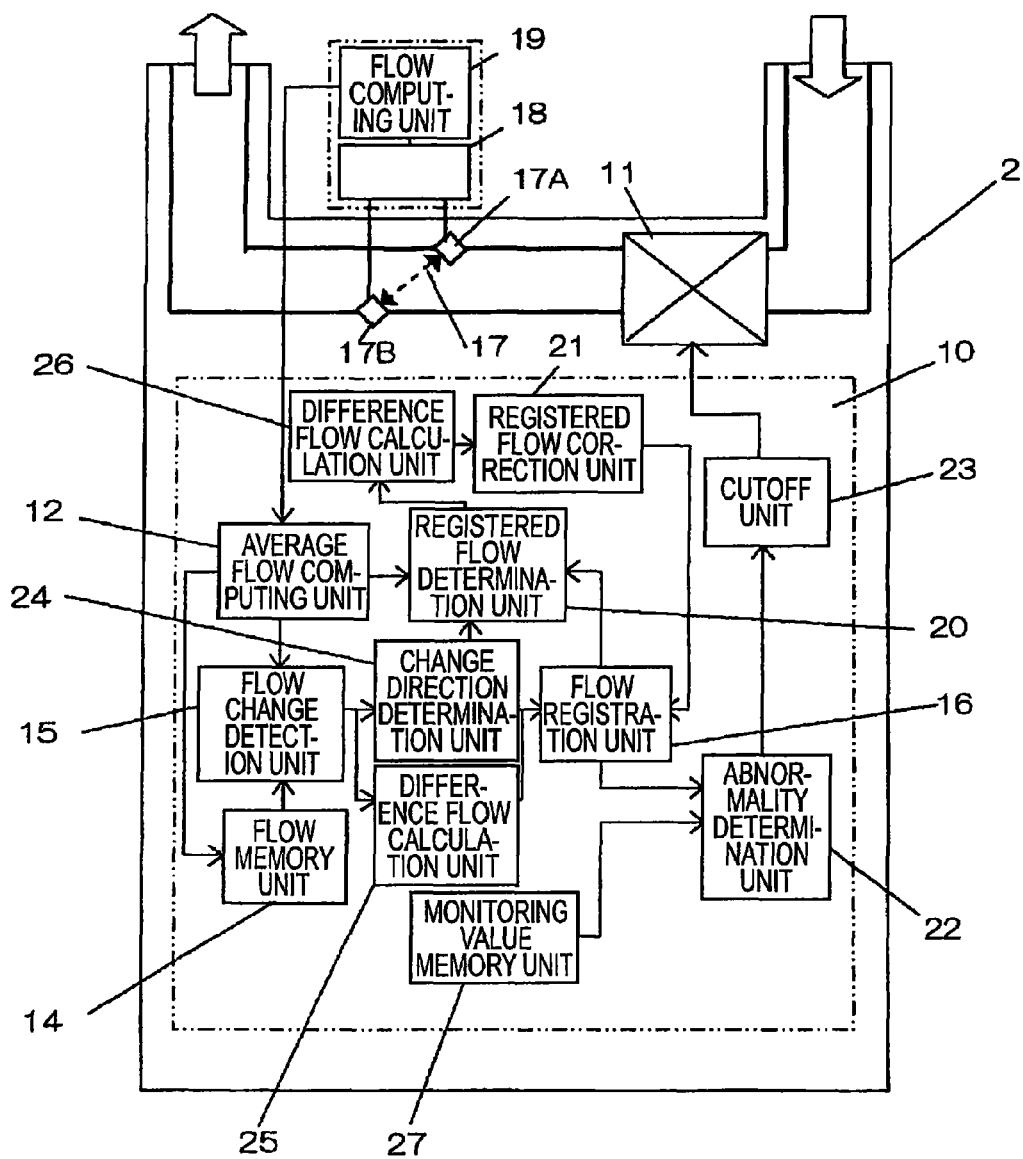
[FIG. 6] It is another control block diagram of the gas cutoff apparatus.

Further, as shown in FIG. 6, when the flow change detection unit 15 outputs a change existence signal, a change direction determination unit 24 determines whether the flow change is an incremental change or a decremental change. Further, a difference flow calculation unit 25 calculates a difference flow quantity between the average flow quantity value computed by the average flow computing unit 12 when the flow change detection unit 15 determines that a change is present and a value stored in the flow memory unit 14. In accordance with a registration signal or a deletion signal from the change direction determination unit 24, there is performed processing for registering or deleting a registered flow quantity value in the flow registration unit 16 by the difference flow calculated by a difference flow calculating unit 25.

The change direction determination unit 24 outputs a deletion signal. When processing for deleting a registered flow quantity value is performed, a registered flow determination unit 20 compares a registered flow quantity value acquired after deletion with an average flow quantity value computed by the average flow computing unit 12, thereby determining whether or not a difference falls within a predetermined range. When the difference is in the range, deletion processing is determined to have been normally performed; namely, the deleted, registered flow quantity value is determined to coincide with the appliance whose operation is stopped. Use of the appliances is continually monitored with the registered flow quantity value being unchanged and without making a correction to the registered flow quantity value. Further, when a result of comparison exceeds the predetermined range, deletion processing is determined not to be correctly performed; namely, the deleted registered flow quantity value is determined not to coincide with the appliance whose operation is stopped. A difference flow calculation unit 26 shown in FIG. 7 performs processing for subtracting the registered flow quantity value acquired after deletion from the average flow quantity value, thereby calculating a resultant difference as a difference flow quantity value. A correction is made to the flow quantity value registered in the flow registration unit 16 by use of the difference flow quantity value which is calculated by the difference flow calculation unit 26, and the registered flow quantity is reset to a flow quantity corresponding to the currently operating appliances.

Operating appliances are monitored by the reset, registered flow quantity. In this case, there is provided a monitoring value memory unit 27 in which there are stored an appliance continual use time limit corresponding to a flow zone, a reference value for monitoring a value of the maximum used flow quantity, and the like; and that has a preset total flow cutoff value for use in monitoring the state of such an abnormally-large flow quantity, which would otherwise arise; for example, when a hose used for supplying gas to an operating appliance, such as a space heater, is disconnected for any reason and a preset operating time cutoff time limit for specifying an operating time limit for a case where an appliance is used for a time period that is much longer than the maximum period of operating time during which the appliance is usually used. An abnormality determination unit 22 ascertains the preset values and the registered flow quantity value in the flow registration unit 16, thereby enabling making of a determination as to whether or not the registered flow quantity value exceeds a value of the maximum used flow quantity, whether or not the appliance operating time exceeds an appliance continual use time limit corresponding to the registered flow quantity value, and the like. When detected an abnormality, the abnormality determination unit 22 sends a signal to a cutoff unit 23, thereby activating the cutoff valve 11 to suspend a gas supply. A cutoff state and specifics of a cutoff state are displayed on a liquid-crystal display element, or the like, and also reported to a center that monitors the safety of gas through a communication unit, and the like.

Operation of the gas cutoff apparatus configured as mentioned above is now described. When gas appliances installed in the customer's house; for instance, the gas space heater 9, the hot water supply 4, and the like, are used, the flow detection unit 17 detects flow quantities of the appliances. When; for instance, an ultrasonic sensor, is used, a propagation time of an ultrasonic signal is measured as a detected value. The signal is sent to the flow computing unit 19, where the signal is calculated as an instantaneous flow quantity value. The average flow computing unit 12 computes an average flow quantity value from a predetermined number of instantaneous flow quantity values each time. A plurality of the thus-determined average flow quantities are periodically stored in time sequence in the flow memory unit 14. From flow quantities stored in the flow memory unit 14 in the past (e.g., the flow quantity kept last time, the flow quantity kept last but one, the flow quantity kept "n" times before, and the like), it is determined whether or not a flow change is present. Specifically, it is determined whether the appliance is used or stopped from the state of the change and by use of the average flow quantity value output at predetermined intervals. The amount of flow change acquired at the time of occurrence of the change is taken as a registered flow quantity for the operating appliance. The flow quantity is newly registered in the flow registration unit 16, or the already-registered flow quantities are deleted, whereby the registered flow quantities corresponding to the appliances operating at the point in time of occurrence of the change can be accurately set.

For instance, when the user uses the hot water supply 4, the flow quantity changes to an arbitrary flow level in a case where the flow quantity registered in the past is zero. The change is determined as a flow change from an average flow quantity and the flow quantity acquired in the past. When a rate of change or the amount of change is a predetermined level or more, the change is determined to be present; namely, an appliance of some kind is registered in the flow registration unit 16 as being currently used. Alternatively, when the hot water supply 4 is used in the course of use of the gas cooker 8, the flow quantity of the gas cooker 8 is recorded in the past flow quantity in the flow memory unit 14. The flow change detection unit 15 determines a flow change from the current average flow quantity and the flow quantity value stored in the past. Likewise, when a rate of change or the amount of flow change from the current flow quantity is a predetermined level or more, the change is determined to be present, and the flow change is registered in the flow registration unit 16. When any appliance is stopped in the course of use of a plurality of appliances or when a change arises in flow quantity, as well as when the number of appliances being used is increased, the flow change detection unit 15 determines, from the flow quantities stored in the past and the average flow quantity, whether or not the change is a decremental change, and outputs a decremental flow change. The flow registration unit 16 deletes or reduces a registered flow quantity value closest to the decremental flow change among the registered flow quantities.

However, in a mode of operation of the hot water supply 4; particularly, in a case where the hot water supply is used for floor heating, and the like, the amount of combustion greatly changes between when load exerted on the hot water supply in its early stage of operation is large and when load exerted on the hot water supply in its stable state is small. In such a case, a flow change is determined to be present in the early stage of operation of the hot water supply, and use of the hot water supply 4 is determined. An average flow quantity value achieved at this point in time is registered in the flow registration unit 16 as a registered flow quantity. When operation is continually carried out, heating load is gradually decreased, whereupon the amount of combustion or the gas flow quantity is controlled in a decreasing manner by proportional control. Since the amount of change achieved at this time is smaller than the determination value set by the flow change detection unit 15, only the average flow quantity value gradually decreases without a flow change being determined to be present. The flow quantity registered in the flow registration unit 16 is recorded while remaining set in the early stage.

Specifically, a difference between the registered flow quantity value and the average flow quantity value greatly increases with elapse of time. When the hot water supply 4 is stopped as a result of the heating load being saturated in this state, the flow change detection unit 15 determines that a flow change is present. The amount of flow change achieved at this time is deleted from the flow quantity registered in the flow registration unit 16. However, the average flow quantity value achieved when the hot water supply 4 is stopped has already become considerably small by proportional control. Therefore, the flow change has also become decreased as compared with that achieved in the early stage. Even when the thus-decreased flow change is deleted from the registered flow quantity, a certain degree of value is left as the registered flow quantity. Existing, registered flow quantities of the appliances that are not actually used also act as registered flow quantities to be compared with the preset value of the monitoring value memory unit 27 by the abnormality determination unit 22. Specifically, operating appliances are monitored by a registered flow quantity whose value is greater than values of the registered flow quantities of the actually-operating appliances. Problems, such as a problem of the cutoff valve 11 erroneously performing cutoff operation within an unexpected short time period as a result of shortening of the continual operation time limit, arise.

Accordingly, in the present invention, when the registered flow quantity is deleted, the registered flow determination unit 20 compares a registered flow quantity value acquired after deletion with the average flow quantity value and determines whether or not a resultant difference lies in a predetermined range. Thus, it is determined whether or not processing for deleting a registered flow quantity has been properly performed. When the difference falls within the predetermined range, deletion processing is determined to have been properly performed. Use of the appliances is continually monitored while the registered flow quantity is recorded at-is. When the difference exceeds the predetermined range, deletion processing is determined not to have been properly performed, and the problem is determined to have arisen as mentioned previously. A signal is sent to the difference flow calculation unit 26, thereby calculating a difference flow quantity value between the sum of registered flow quantity values achieved after deletion and the average flow quantity value computed by the average flow computing unit 12.

Next, the difference flow quantity value data are sent to the registered flow correction unit 21, and the registered flow correction unit 21 makes a correction to the flow quantity registered in the flow registration unit 16, thereby resetting the registered flow quantity to registered flow quantities conforming to the currently operating appliances.

Operating appliances are monitored by the thus-reset registered flow quantity. In case of occurrence of an abnormality, the cutoff valve 11 is activated, to thus stop a gas supply and thereby assure safety.

Correction processing of the registered flow correction unit 21 has been described in connection with the case where a result of comparison between the registered flow quantity value achieved after deletion and the average flow quantity value performed by the registered flow determination unit 20 exhibits a relationship of the registered flow quantity value achieved after deletion>the average flow quantity value. In a relationship of the registered flow quantity value achieved after deletion<the average flow quantity value, the comparison result is determined to be a minute increase, and a difference is output to and registered in the flow registration unit 16, whereby the registered flow quantity corresponding to the state of the currently operating appliances is assured.

Figure 7:
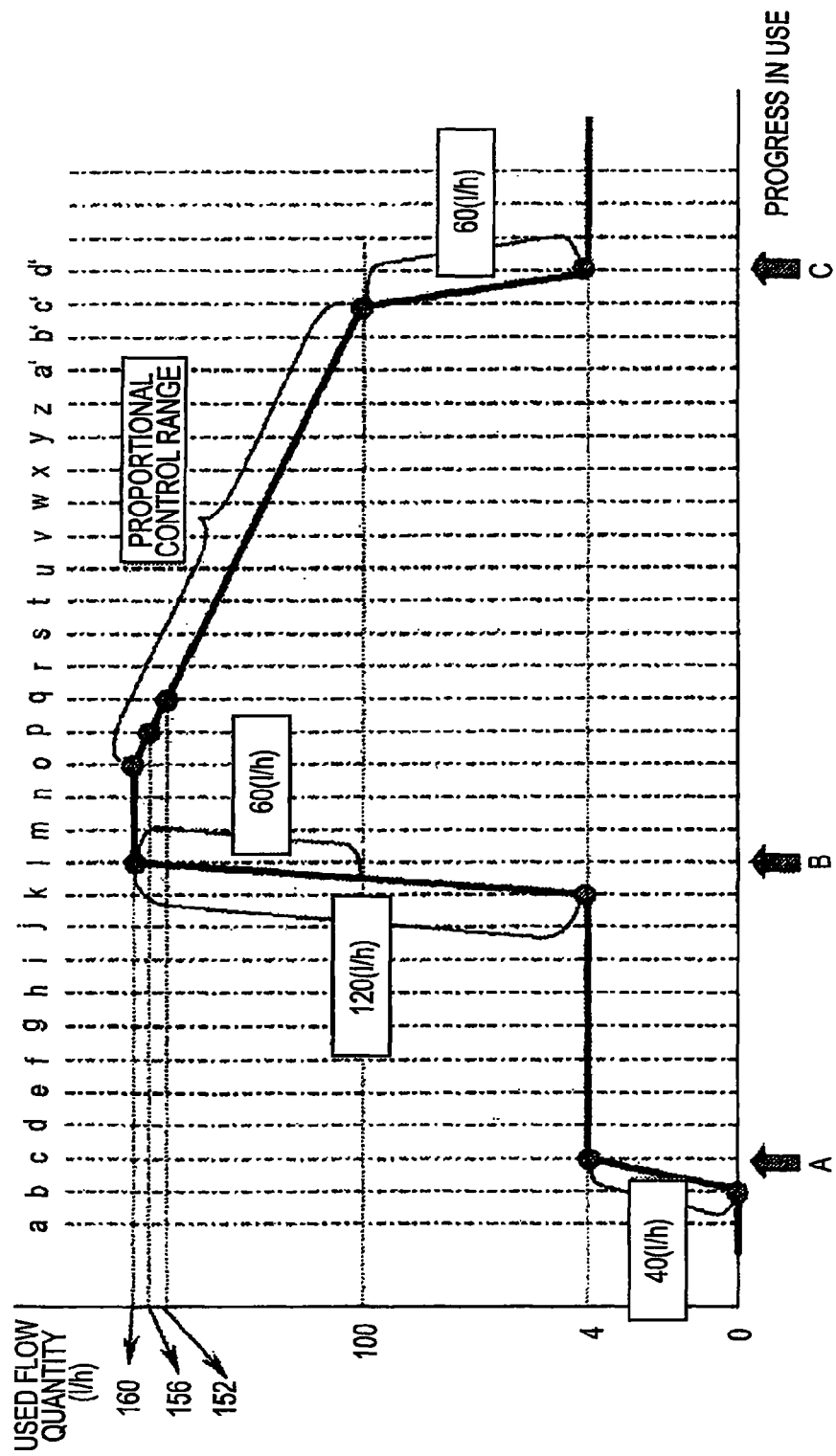
[FIG. 7] It is a view for explaining operation of the gas cutoff apparatus for making a correction to a registered flow quantity.

The correcting operation mentioned above is now described in more detail by reference to FIG. 7. A vertical axis represents the used flow quantity (l/h), and a horizontal axis represents progress in use. Thus, a use arrangement of appliances is illustrated. By way of example, the drawing shows the following state. For instance, a gas space heater is used at point A, and the used flow quantity changes from 0 (l/h) to 40 (l/h). In order to use; for instance, a floor heating, at point B, a hot water supply starts operating, and the used flow quantity changes from 40 (l/h) to 160 (l/h). Subsequently, the amount of combustion of a hot water supply is controlled by proportional control in accordance with a change in heating load, whereby the used flow quantity gradually decreases. Combustion of the hot water supply is stopped at point C where the used flow quantity has decreased to 100 (l/h), and the used flow quantity decreases to 40 (l/h).

Operation of the control circuit 10 that performs appliance monitoring function in the above use arrangement is described. The flow detection unit 17 and the flow computing unit 19 detect the gas used flow quantity as an instantaneous flow quantity value. A predetermined number of instantaneous flow quantity values are aggregated and averaged, or instantaneous flow quantity values are aggregated or averaged at predetermined time intervals, whereby the instantaneous flow quantity values are computed as an average flow quantity value at timings of "a," "b," "c," . . . "a'," "b'', "c'," and "d'," and the thus-computed average flow quantity values are stored in the flow memory unit 14.

The flow change detection unit 15 compares an average flow quantity value of 40 (l/h) determined at timing "c" and at point A with an average flow quantity value of 0 (l/h) which has been achieved at timing "b" and stored in the flow memory unit 14. When a comparison result shows that a difference flow quantity is a predetermined value; for instance, 10 (l/h), or more, a change is determined to be present, and the appliance is determined to be used or stopped. A signal is sent to the change direction determination unit 24, where the change is determined to be incremental or decremental. In the case of the use arrangement shown in FIG. 7, a change shows an increase from 0 (l/h) to 40 (l/h); hence, an appliance is determined to be used. The difference flow calculation unit 25 calculates a difference flow of 40 (l/h). The difference flow of 40 (l/h) is newly registered as a registered flow quantity value in the flow registration unit 16. A restriction on use of the gas appliances is monitored by the registered flow quantity value until a subsequent change occurs. In the use arrangement shown in FIG. 7, the average flow quantity value does not change from timing "c" to timing "k." Hence, the registered flow quantity value remains at a difference flow of 40 (l/h) registered in the initial stage.

The flow change detection unit 15 compares an average flow quantity value of 160 (l/h) determined at point B and timing "l" with an average flow quantity value of 40 (l/h) achieved at timing "k" and stored in the flow memory unit 14. When a comparison result shows that a difference flow of 120 (l/h) is larger than a predetermined value; for instance, 10 (l/h), a change is determined to be present, and the appliance is determined to be used or stopped. A signal is sent to the change direction determination unit 24, where the change is determined to be incremental or decremental. The flow change occurred at point B shows an increase from 40 (l/h) to 160 (l/h); hence, an appliance is determined to be used. The difference flow calculation unit 25 calculates a difference flow of 120 (l/h). The difference flow of 120 (l/h) is newly registered as a registered flow quantity value in the flow registration unit 16.

Use limit on the gas appliances are monitored by a total value of 160 (l/h) that is a sum of the previous registered flow quantity value of 40 (l/h) and the current registered flow quantity value of 120 (l/h).

The gas flow quantity is controlled by proportional control, and the like, from timing "p" to timing "C" subsequent to point B, whereby the used flow quantity gradually decreases at a small rate of change. An average flow quantity value acquired at timing "p" is 156 (l/h). Even when compared with an average flow quantity value of 160 (l/h) at timing "o" stored in the flow memory unit 14 by the flow change detection unit 15, the average flow quantity value acquired at timing "p" is smaller than a predetermined comparative reference value of 10 (l/h), so that a determination showing "no change" is made. Processing for changing the registered flow quantity value is not performed. Further, an average flow quantity value acquired at timing "q" is also changed by similar proportional control and hence comes to 152 (l/h). A difference flow between this average flow quantity value and the average flow quantity value of 156 (l/h) acquired at timing "p" and stored in the flow memory unit 14 is 4 (l/h). Even when these average flow quantity values are compared with each other by the flow change detection unit 15, a similar determination result showing "no change" is yielded. Hence, processing for changing the registered flow quantity value is not performed.

As mentioned above, a result of determination made by the flow change detection unit 15 shows "no change" until timing "c'" where a small amount of change arises. Therefore, processing for changing the registered flow quantity value is not performed, and a difference flow quantity value of 120 (l/h) registered at point B is recorded as a registered flow quantity value.

However, an average flow quantity value acquired at timing "c'" is 100 (l/h), and a difference flow quantity value of 60 (l/h) is a value to be set as a registered flow quantity value conforming to an actual operating state. The objective of the present invention is to minimize a discrepancy between 120 (l/h) and 60 (l/h), to thus make the registered flow quantity value close to a flow quantity value conforming to the actual operating state.

The flow change detection unit 15 compares an average flow quantity value of 40 (l/h) determined at timing "d" and at point C with an average flow quantity value of 100 (l/h) acquired at timing "c'" and stored in the flow memory unit 14. A result of comparison shows that a difference flow of 60 (l/h) is a predetermined value; for instance, 10 (l/h), or more; hence, a "change" is determined to be present, and the appliance is determined to be used or stopped. A signal is sent to the change direction determination unit 24, where the change is determined to be incremental or decremental. Since the flow change acquired at point C changes from 100 (l/h) to 40 (l/h) in a decreasing manner, use of the appliance is determined to be stopped, and the difference flow calculation unit 25 calculates a difference flow of 60 (l/h).

Since the difference flow of 60 (l/h) is a decremental change, there is performed, in the present embodiment, processing for deleting a difference flow of 120 (l/h) that is a registered flow quantity value greater than and closer to the difference flow of 60 (l/h), among the flow of 40 (l/h) and the flow of 120 (l/h) currently registered in the flow registration unit 16. As a result of deletion processing, 40 (l/h) and 60 (l/h) are left as flow quantity values registered in the flow registration unit 16, and a value of 100 (l/h) is present as a sum of the registered flow quantity values.

The registration flow determination unit 20 compares a value of 100 (l/h) that is a sum of the registered flow quantity values acquired after deletion processing with the average flow quantity value of 40 (l/h) acquired at timing "d'," thereby determining whether or not a resultant difference flow falls within a predetermined range; for instance, 5% of the average flow quantity value. When exceeded the range, the difference flow is determined to be abnormal. In the present embodiment, the difference flow comes to a value of 60 (l/h) which is in excess of 5% of an average flow quantity value of 40 (l/h); namely, 2 (l/h). Hence, the difference flow is determined to be abnormal, and the difference flow computing unit 26 calculates a difference flow of 60 (l/h).

The registered flow correction unit 21 makes a correction to the registered flow quantity value acquired after deletion processing by the difference flow of 60 (l/h) calculated by the difference flow computing unit 26. In this case, a value of 40 (l/h) and a value of 60 (l/h) are present as registered flow quantity values. A registered flow quantity value among the registered flow quantity values, which value is greater than and closer to the difference flow, is taken as an object of correction in the same manner as mentioned previously. In the present embodiment, the registered flow quantity value of 60 (l/h) becomes an object, and the registered flow quantity value of 60 (l/h) is corrected; namely, subjected to subtraction processing, by the difference value of 60 (l/h). A value of 40 (l/h) is left as the registered flow quantity value. The registered flow quantity value coincides with the average flow quantity value of 40 (l/h) determined at a timing of "d'." Thus, the registered flow quantity value can be made close to a flow quantity value conforming to the actual operating state.

The numerical limitation employed in the present embodiment is a mere example, and the use arrangement is not limited to the present embodiment, either.

As mentioned above, when the flow change determination unit 15 has detected a flow change of predetermined level or greater, it is determined whether use of an appliance is started or stopped. When use of an appliance is started, the flow change is registered and set as a registered flow quantity value corresponding to a use limit on the appliance. When use of an appliance is stopped, a registered flow quantity close to the flow change is deleted, and the remaining registered flow quantity is set as being close to an actual operating state. Further, it is determined whether or not the registered flow quantity acquired after deletion conforms to an operating appliance. When the registered flow quantity is determined not to conform to the operating appliance, a correction is made to the registered flow quantity in accordance with the difference flow quantity, thereby making the registered flow quantity close to a value conforming to the operating appliance. Therefore, even when another registered flow quantity is erroneously deleted at the time of deletion of the registered flow quantity acquired when use of an appliance is stopped, a correction can be made to the registered flow quantity so as to conform to the currently operating appliance. It is possible to provide a highly safe gas cutoff apparatus that can prevent occurrence of erroneous cutoff operation by assuring a use limit function appropriate to operating appliances.

Moreover, it is determined as more specific means whether or not the registered flow quantity acquired after deletion is a registered flow quantity conforming to an operating appliance. When the registered flow quantity is determined not to conform to the operating appliance, a correction is made to the registered flow quantity in accordance with a difference flow quantity calculated by the difference flow calculation unit, thereby making the registered flow quantity close to a value conforming to the operating appliance. Thus, it is possible to make an accurate correction on the registered flow quantity when the registered flow quantity is monitored on a per-operating-appliance basis.

A fifth invention is directed toward a gas cutoff apparatus that monitors operating conditions of a plurality of gas appliances connected to portions of a pipe extending from a gas meter and that cuts off a gas supply at the time of occurrence of an abnormality, the gas meter including: a flow detection unit that measures a gas flow quantity; a flow computing unit that computes a flow quantity value from a detected value of the flow detection unit; an average flow computing unit obtains an average flow quantity value by averaging, at each predetermined time, instantaneous flow quantity values computed by the flow computing unit; an average time clock unit that counts an averaging time; a flow memory unit that stores the average flow quantity value obtained by the average flow computing unit; a flow change determination unit that determines presence of a flow change when a difference between the value obtained by the average flow computing unit and a value stored in the flow memory unit is larger than a preset first change value; a flow registration unit that registers or deletes a flow quantity corresponding to the flow change in accordance with a direction of the change when the flow change determination unit determines that a change is present; a registered flow correction unit that makes a correction to a flow quantity value in the flow registration unit when a difference between a value obtained by the average flow computing unit and the value registered in the flow registration unit is smaller than the first change value and larger than a second change value; a monitoring value memory unit that memories a determination value for monitoring an abnormality in an operating state; an abnormality determination unit that compares the flow quantity value in the flow registration unit with a corresponding determination value in the monitoring value memory unit, thereby determining presence or absence of an abnormality; and a cutoff unit that cuts off a gas supply when the abnormality determination unit has made an abnormality determination.

When the flow change determination unit has detected a flow change of predetermined level or more, it is determined whether use of an appliance is started or stopped. When use of an appliance is started, a flow quantity commensurate with the flow change is registered and set as a registered flow quantity value corresponding to a use limit on the appliance. When use of an appliance is stopped, a registered flow quantity close to the flow change is deleted, and the remaining registered flow quantity is set as being close to an actual operating state. When the flow change is small and cannot be detected by the flow change determination unit and when the flow change lies in a predetermined range, a correction is made to the registered flow quantity value by a value commensurate with the flow change. Therefore, even in a case where the gas flow quantity gradually changes at a small rate of change by proportional control, and the like, when the flow change falls within a predetermined range, a correction is made to the registered flow quantity each time, thereby enabling setting of a registered flow quantity conforming to the currently operating appliances. It is possible to provide a highly safe gas cutoff apparatus that can prevent occurrence of erroneous cutoff operation by assuring a use limit function appropriate to operating appliances.

A sixth invention is characterized in that the gas cutoff apparatus has a change value determination unit which compares an average flow quantity value obtained by the average flow computing unit with a sum of flow quantities registered in the flow registration unit in synchronism with a countup signal of the average time clock unit; and which outputs a correction signal to the registered flow correction unit when a change of predetermined level or more is detected.

A difference between the average flow quantity value and the registered flow quantity value is determined every averaging time at which an average flow quantity value is determined. When the difference has exceeded the second change value used for determining initiation of correcting operation, a correction is made to the flow quantity value in the flow registration unit by use of the difference. Hence, even when the gas flow quantity gradually changes at a small rate of change that is smaller than the first change value, a correction can be made to the registered flow quantity value at appropriate timing. The registered flow quantity can be set more accurately in agreement with the currently operating appliances. It is possible to provide a highly safe gas cutoff apparatus that can prevent occurrence of erroneous cutoff operation by assuring a use limit function appropriate to operating appliances.

An embodiment of the present invention is hereinbelow described by reference to the drawings. The present invention is not limited to the embodiment.

(Third Embodiment)

Figure 8:
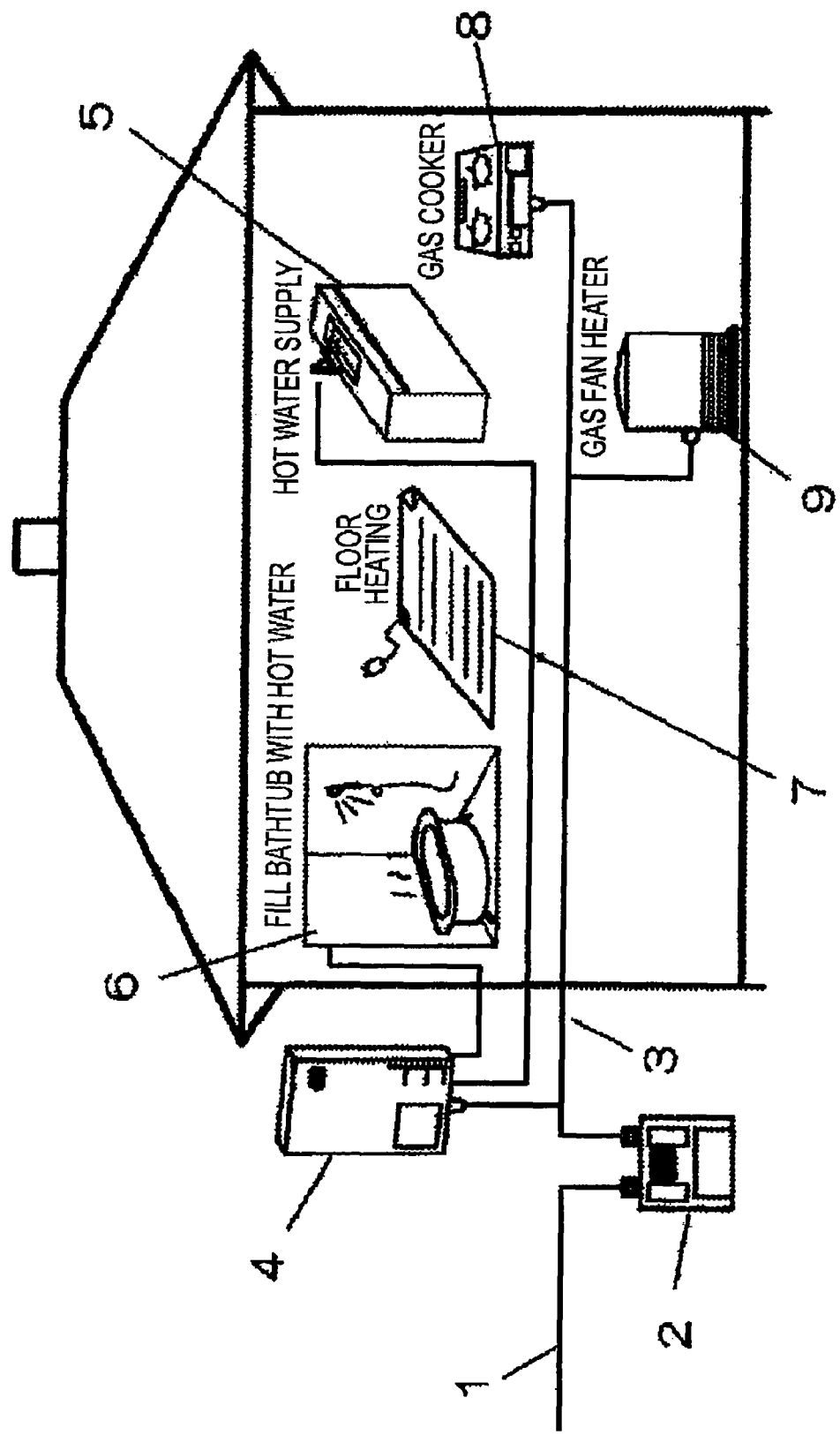
[FIG. 8] It is a view showing a mode of installation of a gas cutoff apparatus and a gas appliance of a third embodiment of the present invention.
Figure 9:
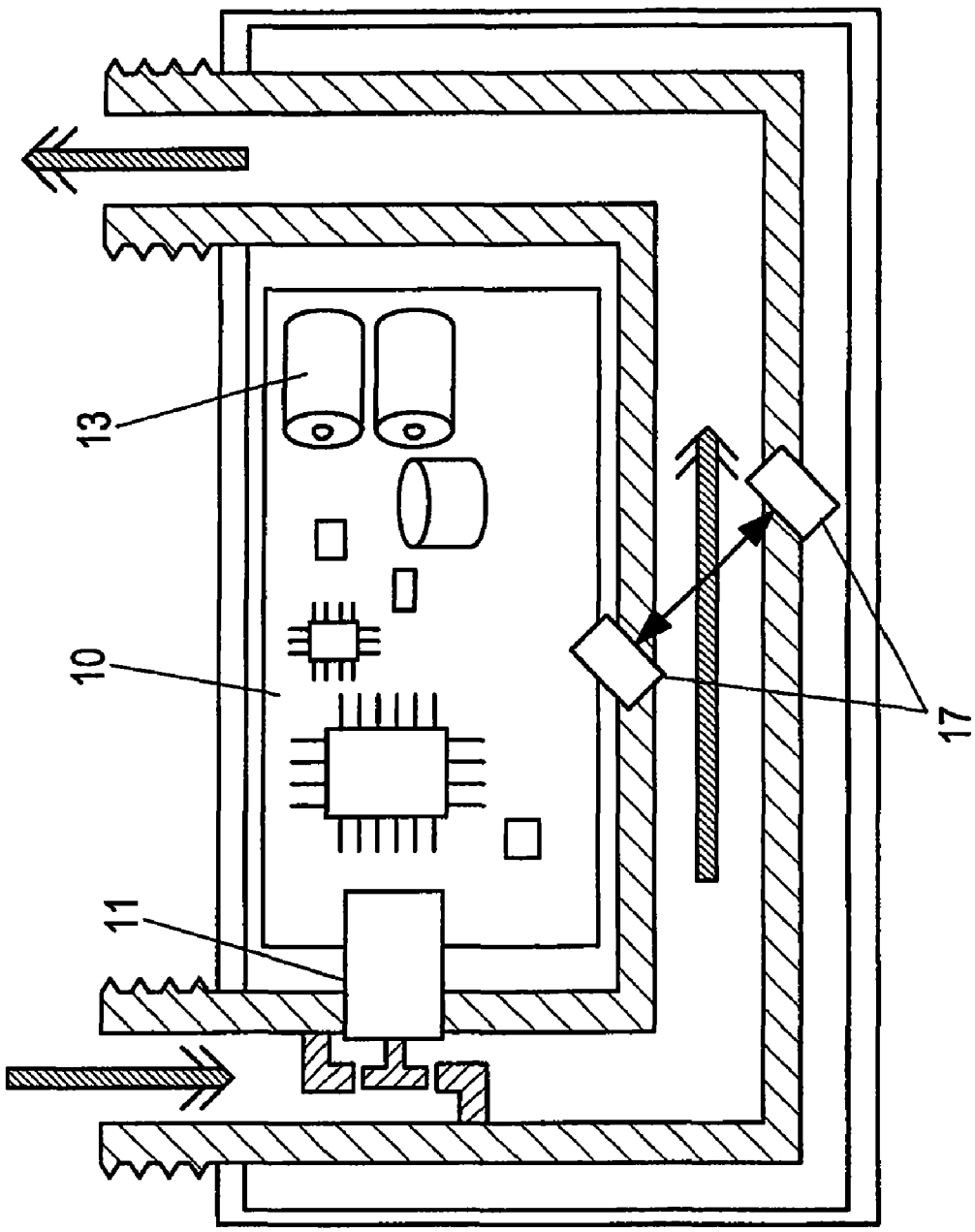
[FIG. 9] It is an internal schematic diagram of the gas cutoff apparatus.
Figure 10:
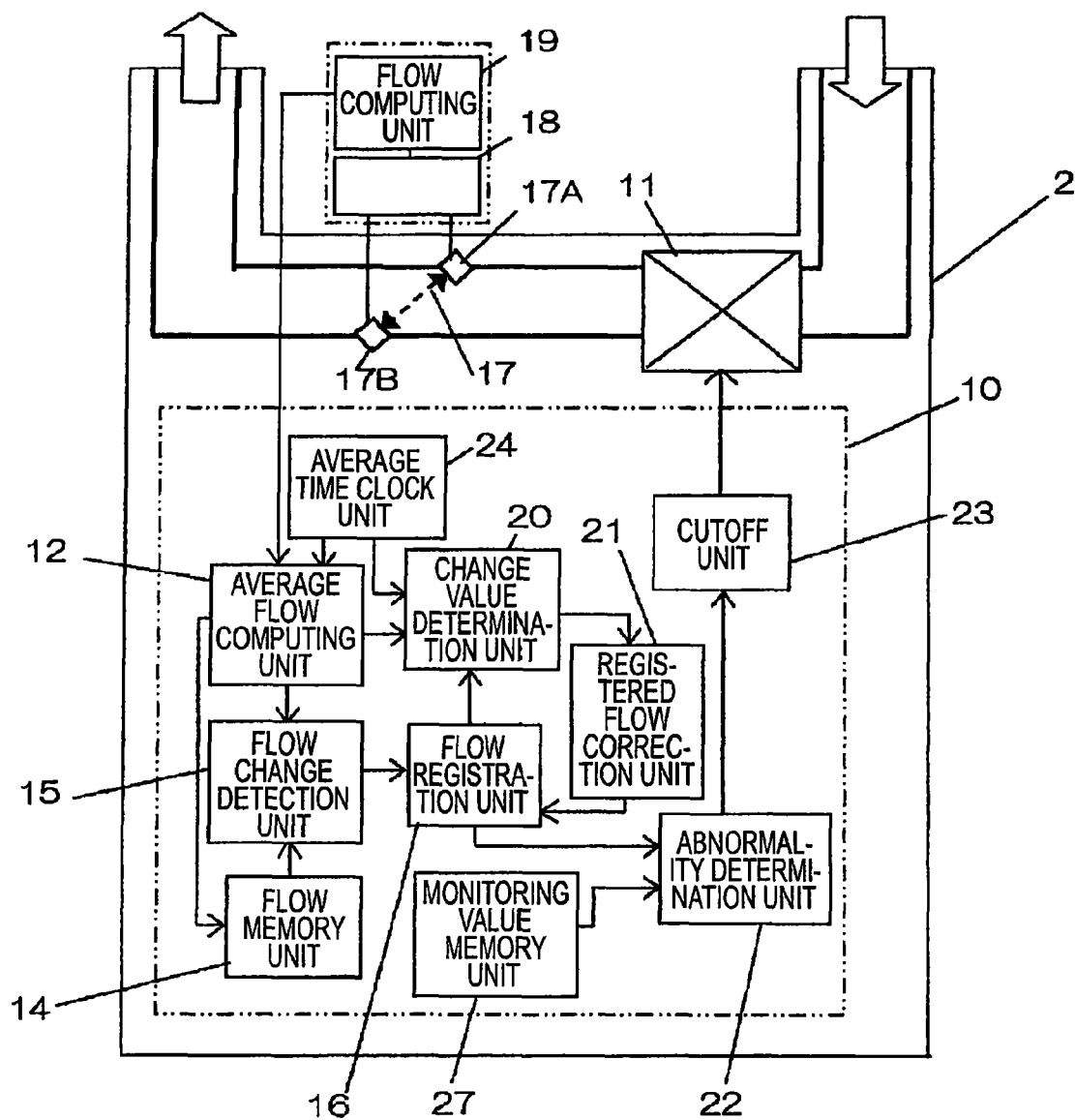
[FIG. 10] It is a control block diagram of the gas cutoff apparatus.

FIG. 8 is a view showing a mode of installation of a gas cutoff apparatus and gas appliances of a third embodiment of the present invention, FIG. 9 is an internal schematic diagram of the gas cutoff apparatus, and FIG. 10 is a control block diagram of the gas cutoff apparatus.

The gas meter 2 is installed at the entrance of the gas supply line 1 of an individual household. The gas pipe 3 extending from the gas meter 2 branches to locations where various gas appliances used in the household are installed, and gas is supplied by way of the pipe. For example, the gas hot water supply 4 is installed outdoors. Hot water produced by the gas hot water supply 4 is supplied, by way of a water pipe, to the hot water faucet 5 of a kitchen, a bathroom 6 where a bathtub or a shower unit is installed, a floor heating 7 set in a living room, and the like. Thus, various use arrangements are realized.

In the interior of a house, gas is supplied to the gas cooker 8 installed in the kitchen and the gas fan heater 9 set in the living room, a bedroom, and others. The gas appliances are used, as required, according to the circumstances.

When gas is consumed as a result of use of any of the thusinstalled gas appliances, the gas meter 2 measures the quantity of gas used, and data are cumulatively kept at predetermined interval. After subjected to predetermined information processing in accordance with a periodic data request command from a gas service provider, the data stored in the gas meter 2 is transmitted to customers and a gas utility company as information, such as a gas charge, the quantity of gas used, or discount service offered by the gas utility company.

A gas passageway having a gas inlet and a gas outlet is formed in the gas meter 2. Disposed in the gas passageway are the cutoff valve 11 for cutting off gas in case of an abnormality and the pair of ultrasonic sensors 17*a* and 17*b* serving as a flow detection unit 17 for measuring the gas flow quantity. Further, the gas meter has a built-in control circuit 10 made up of a flow computing unit 19 that computes the gas flow quantity from a signal from the flow detection unit 17 and an average flow computing unit 12 that aggregates the thus-computed instantaneous flow quantity value for a predetermined time period clocked by an average time clock unit 24, to thus compute an average flow quantity value. Further, the gas meter houses a battery 13 for driving the control circuit 10.

Various types are available for the flow detection unit. For instance, one type is to transmit an ultrasonic signal by a pair of ultrasonic sensors disposed in the passageway described in connection with the present embodiment from one sensor to the other and detect the quantity of gas used in accordance with a propagation time consumed by transmission. Another type is to place a hot wire sensor in the passageway and determine the flow quantity from impedance that changes in accordance with a flow. Still another type is to detect the quantity of gas by a measurement membrane and convert mechanical action of the measurement membrane into an electric pulse signal by a magnet, a lead switch, or a magnetoresistance element, or the like, thereby detecting the flow quantity. A gas meter adopting a gas cutoff apparatus using an ultrasonic sensor as a flow detection unit is described in connection with the present embodiment.

Accordingly, the flow detection unit 17 using the ultrasonic sensors 17*a* and 17*b* is first, briefly descried. A first transceiver 17A for transmitting or receiving an ultrasonic wave and a second transceiver 17B for receiving or transmitting the same are disposed along a direction of flow. The transceivers can be toggled between a transmission mode and a receiving mode by a measurement control section 18 having a switching unit making up the control circuit 10, and a flowing state of a fluid, such as gas, is detected. The flow quantity is measured by processing signals from the first transceiver 17A and the second transceiver 17B. Specifically, the measurement control section 18 first drives the first transceiver 17A, thereby transmitting an ultrasonic wave toward the second transceiver 17B; namely, from an upstream position toward a downstream position. A signal received by the second transceiver 17B is amplified by an amplifying unit provided in the measurement control section 18. The thus-amplified signal is compared with a reference signal. After detection of a signal that is the reference signal or more, the transmission and receiving operations mentioned above are repeated a predetermined number of times by a repetition unit provided in the measurement control section 18. Resultant time values are respectively measured by a clock unit, such as a timer counter, provided in the measurement control section 18.

The measurement control section 18 having the switching unit toggles between the transmission operation of the first transceiver 17A and the receiving operation of the second transceiver 17B, thereby transmitting an ultrasonic signal from the second transceiver 17B toward the first transceiver 17A; namely, from the downstream position toward the upstream position. Transmission is iterated as mentioned previously, and resultant time values are respectively measured. In consideration of the size of the passageway and the flowing state of a fluid, a signal processing unit 19 making up the flow computing unit determines a flow quantity value from a difference between the propagation time of the ultrasonic wave from the first transceiver 17A and the propagation time of the ultrasonic wave from the second transceiver 17B. Flow data are determined at predetermined periods as an instantaneous flow quantity value.

Instantaneous flow quantity values determined at predetermined periods are input to the average flow computing unit 12, where instantaneous flow quantity values are aggregated and averaged for an averaging time clocked by the average time clock unit 24, to thus be calculated as an average flow quantity value. The average flow quantity value is recorded in time sequence in a flow memory unit 14. A flow change detection unit 15 compares the thus-kept average flow quantity value with the average flow quantity value calculated by the average flow computing unit 12, thereby determining whether or not a change of predetermined value or more is present. Thus, it is determined whether or not use of an appliance is started. For instance, when the customer uses the hot water supply 4, the flow quantity value changes from zero to a predetermined flow quantity. Alternatively, when the hot water supply 4, or the like, is used in the course of use of another appliance, a determination is made, on the basis of the determined average flow and the flow quantity values kept in the past, as to whether or not a rate of flow change or the amount of flow change is a predetermined level or greater, whereby it is determined whether the appliance is used or stopped.

When the flow change detection unit 15 detects a change value of predetermined level or more, an appliance is determined to be used or stopped. Specifically, when an appliance is used, the amount of flow change is registered in a flow registration unit 16, to thus be set as a registered flow quantity value. In this case, every time an incremental flow change is detected, an appliance is determined to be additionally used. The flow change is newly registered and set as a registered flow quantity value each time. On the contrary, when use of an appliance is stopped, a registered flow quantity value close to the flow change among the flow quantity values registered in the flow registration unit 16 is deleted. Likewise, even in deletion processing, every time a decremental flow change is detected, use of an appliance is determined to be stopped, and processing for deleting a corresponding registered flow quantity value is performed each time.

In synchronism with an averaging time clocked by the average time clock unit 24, the change value determination unit 20 compares the flow quantity value registered in the flow registration unit 16 with the average flow quantity value. When a comparison result is smaller than the first change value that is a criterion of the flow change detection unit 15 and that is greater than a predetermined second change value, the gas flow is controlled by proportional control, and the like, whereby the gas flow is determined to change at a small rate of change. A correction signal is then sent to the registered flow correction unit 21, thereby correcting the flow quantity value registered in the flow registration unit 16 and resetting the registered flow quantity so as to conform to the currently operating appliances.

Operating appliances are monitored by the reset, registered flow quantity. In this case, there is provided a monitoring value memory unit 27 in which there are stored an appliance continual use time limit corresponding to a flow zone, a reference value for monitoring a value of the maximum used flow quantity, and the like; and that has a preset total flow cutoff value for use in monitoring the state of such an abnormally-large flow quantity, which would otherwise arise; for example, when a hose used for supplying gas to an operating appliance, such as a space heater, is disconnected for any reason and a preset operating time cutoff time limit for specifying an operating time limit for a case where an appliance is used for a time period that is much longer than the maximum time period during which the appliance is usually used. An abnormality determination unit 22 ascertains the preset values and the registered flow quantity value in the flow registration unit 16, thereby enabling making of a determination as to whether or not the registered flow quantity value exceeds a value of the maximum used flow quantity, whether or not the appliance operating time exceeds an appliance continual use time limit corresponding to the registered flow quantity value, and the like. When detected an abnormality, the abnormality determination unit 22 sends a signal to a cutoff unit 23, thereby activating the cutoff valve 11 to suspend a gas supply. A cutoff state and specifics of a cutoff state are displayed on a liquid-crystal display element, or the like, and also reported to a center that monitors the safety of gas through a communication unit, and the like.

Operation of the gas cutoff apparatus configured as mentioned above is now described. When gas appliances installed in the customer's house; for instance, the gas space heater 9, the hot water supply 4, and the like, are used, the flow detection unit 17 detects flow quantities of the appliances. When; for instance, an ultrasonic sensor, is used, a propagation time of an ultrasonic signal is measured as a detected value. The signal is sent to the flow computing unit 19, where the signal is calculated as an instantaneous flow quantity value. The average flow computing unit 12 computes an average flow quantity value from instantaneous flow quantity values for each averaging time clocked by the average time clock unit 24. A plurality of the thus-determined average flow quantities are periodically stored in time sequence in the flow memory unit 14. From flow quantities stored in the flow memory unit 14 in the past (e.g., the flow quantity kept last time, the flow quantity kept last but one, the flow quantity kept "n" times before, and the like), it is determined whether or not a flow change is present. Specifically, it is determined whether the appliance is used or stopped from the state of the change and by use of the average flow quantity value output at predetermined intervals. The amount of flow change acquired at the time of occurrence of the change is taken as a registered flow quantity for the operating appliance. The flow quantity is newly registered in the flow registration unit 16, or the already-registered flow quantities are deleted, whereby the registered flow quantities corresponding to the appliances operating at the point in time of occurrence of the change can be accurately set.

For instance, when the user uses the hot water supply 4, the flow quantity changes to an arbitrary flow level in a case where the flow quantity registered in the past is zero. The change is determined as a flow change from an average flow quantity and the flow quantity acquired in the past. When a rate of change or the amount of change is a predetermined level or more, the change is determined to be present; namely, an appliance of some kind is registered in the flow registration unit 16 as being currently used. Alternatively, when the hot water supply 4 is used in the course of use of the gas cooker 8, the flow quantity of the gas cooker 8 is recorded in the past flow quantity in the flow memory unit 14. The flow change detection unit 15 determines a flow change from the current average flow quantity and the flow quantity value stored in the past. Likewise, when a rate of change or the amount of flow change from the current flow quantity is a predetermined level or more, the change is determined to be present, and the flow change is registered in the flow registration unit 16. When any appliance is stopped in the course of use of a plurality of appliances or when a change arises in flow quantity, as well as when the number of appliances being used is increased, the flow change detection unit 15 determines, from the flow quantities stored in the past and the average flow quantity, whether or not the change is a decremental change, and outputs a decremental flow change. The flow registration unit 16 deletes or reduces a registered flow quantity value closest to the decremental flow change among the registered flow quantities.

However, in a mode of operation of the hot water supply 4; particularly, in a case where the hot water supply is used for floor heating, and the like, the amount of combustion greatly changes between when load exerted on the hot water supply in its early stage of operation is large and when load exerted on the hot water supply in its stable state is small. In such a case, a flow change is determined to be present in the early stage of operation of the hot water supply, and use of the hot water supply 4 is determined. An average flow quantity value achieved at this point in time is registered in the flow registration unit 16 as a registered flow quantity. When operation is continually carried out, heating load is gradually decreased, whereupon the amount of combustion or the gas flow quantity is controlled in a decreasing manner by proportional control. Since the amount of change achieved at this time is smaller than the determination value set by the flow change detection unit 15; for instance, the first change value, only the average flow quantity value gradually decreases without a flow change being determined to be present. The flow quantity registered in the flow registration unit 16 is recorded while remaining set in the early stage.

Specifically, a difference between the registered flow quantity value and the average flow quantity value greatly increases with elapse of time. When the hot water supply 4 is stopped as a result of the heating load being saturated in this state, the flow change detection unit 15 determines that a flow change is present. The amount of flow change achieved at this time is deleted from the flow quantity registered in the flow registration unit 16. However, the average flow quantity value achieved when the hot water supply 4 is stopped has already become considerably small by proportional control. Therefore, the flow change has also become decreased as compared with that achieved in the early stage. Even when the thus-decreased flow change is deleted from the registered flow quantity, a certain degree of value is left as the registered flow quantity. Existing, registered flow quantities of the appliances that are not actually used also act as registered flow quantities to be compared with the preset value of the monitoring value memory unit 21 by the abnormality determination unit 22. Specifically, operating appliances are monitored by a registered flow quantity whose value is greater than values of the registered flow quantities of the actually-operating appliances. Problems, such as a problem of the cutoff valve 11 erroneously performing cutoff operation within an unexpected short time period as a result of shortening of the continual operation time limit, arise.

Accordingly, in the present invention, the change value determination unit 20 compares the average flow quantity value obtained by the average flow computing unit 12 with a sum of flow quantity values registered in the flow registration unit 16 in synchronism with a countup signal from the average time clock unit 24 that clocks an averaging time used for determining an average flow quantity value, in relation to a flow change that is equal to or less than the first change value for which the flow change detection unit 15 cannot detect "existence of a flow change." When a comparison result shows that the difference between the average flow quantity value and the sum of the registered flow quantity values is a preset second change value or more, a correction signal is sent to the registered flow correction unit 21, thereby making a correction to the flow quantity value registered in the flow registration unit 16 by use of the difference value determined by the change value determination unit 20. In the present invention, no reference is made to which one of registered flow quantity values is corrected in the series of correction processing operations mentioned above when there are the plurality of registered flow quantity values. However, for instance, an appliance determination unit that specifies an appliance from the state of a change may also be provided; an operation signal may also be acquired directly from an appliance; or an appliance to be subjected to flow change may also be specified by still another means.

As mentioned above, when the flow change determination unit 15 has detected a flow change of first change value or more, it is determined whether use of an appliance is started or stopped. When use of an appliance is started, a flow quantity corresponding to a flow change is registered and set as a registered flow quantity corresponding to a use limit on the appliance. When use of an appliance is stopped, the registered flow quantity close to the flow change is deleted, to thus set the registered flow quantity close to an actual operating state. When the flow change is small and cannot be detected by the flow change determination unit 15 and when the flow change lies in a predetermined range; namely, when the flow change is smaller than the first change value and larger than the second change value, a correction is made to the registered flow quantity value by the flow quantity corresponding to the flow change. Therefore, even in a case where the gas flow quantity gradually changes at a small rate of change by proportional control, and the like, when the flow change falls within the predetermined range, a correction is made to the registered flow quantity each time, so that a registered flow quantity conforming to the currently operating appliances can be set. It is possible to provide a highly safe gas cutoff apparatus that can prevent occurrence of erroneous cutoff operation by assuring an appropriate operation limit function corresponding to an operating appliance.

Figure 11:
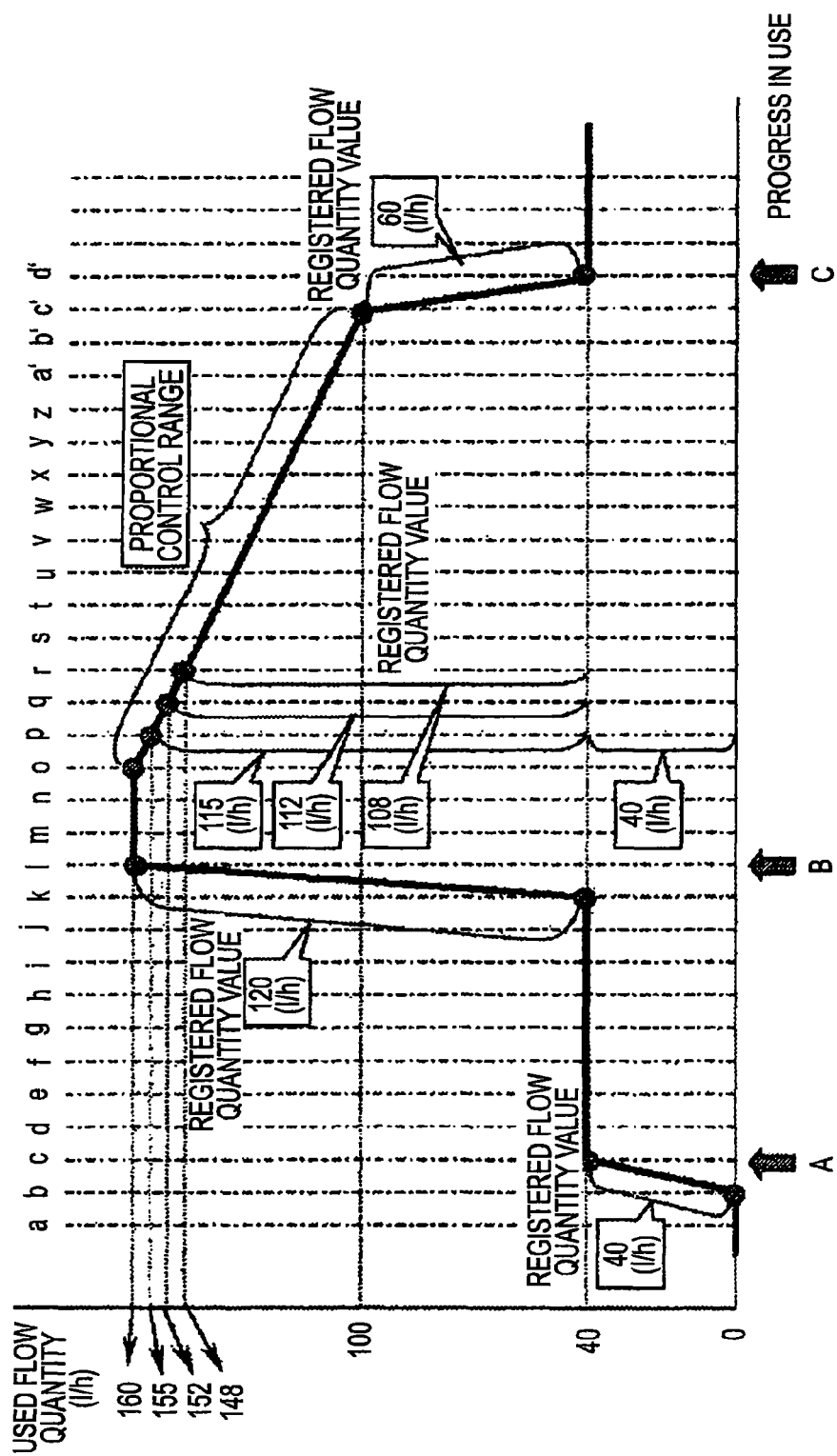
[FIG. 11] It is a view for explaining operation of the gas cutoff apparatus for making a correction to a registered flow quantity.

The correcting operation mentioned above is now described in more detail by reference to FIG. 11. A vertical axis represents the used flow quantity (l/h), and a horizontal axis represents progress in use. Thus, a use arrangement of appliances is illustrated. By way of example, the drawing shows the following state. For instance, a gas space heater is used at point A, and the used flow quantity changes from 0 (l/h) to 40 (l/h). In order to use; for instance, a floor heating, at point B, a hot water supply starts operating, and the used flow quantity changes from 40 (l/h) to 160 (l/h). Subsequently, the amount of combustion of a hot water supply is controlled by proportional control in accordance with a change in heating load, whereby the used flow quantity gradually decreases. Combustion of the hot water supply is stopped at point C where the used flow quantity has decreased to 100 (l/h), and the used flow quantity decreases to 40 (l/h).

Operation of the control circuit 10 that performs appliance monitoring function in the above use arrangement is described. The flow detection unit 17 and the flow computing unit 19 detect the gas used flow quantity as an instantaneous flow quantity value. Instantaneous flow quantity values are aggregated or averaged for a predetermined time period clocked by the average time clock unit 24, whereby the instantaneous flow quantity values are computed as an average flow quantity value at timings of "a," "b," "c," . . . "a'," "b'," "c'," and "d'," and the thus-computed average flow quantity values are stored in the flow memory unit 14.

The flow change detection unit 15 compares an average flow quantity value of 40 (l/h) determined at timing "c" and at point A with an average flow quantity value of 0 (l/h) that has been achieved at time "b" and kept in the flow memory unit 14. When a comparison result shows that a difference flow quantity is a predetermined value; for instance, 10 (l/h), or more, "a change is determined to be present," and the appliance is determined to be used or stopped. Further, it is determined whether the change is incremental or decremental. In the case of the use arrangement shown in FIG. 11, a change shows an increase from 0 (l/h) to 40 (l/h); hence, an appliance is determined to be used, whereby a difference flow of 40 (l/h) is calculated. The difference flow of 40 (l/h) is newly registered as a registered flow quantity value in the flow registration unit 16. A restriction on use of the gas appliances is monitored by the registered flow quantity value until a subsequent flow change occurs. In the use arrangement shown in FIG. 11, the average flow quantity value does not change from timing "c" to timing "k." Hence, the registered flow quantity value remains at a difference flow of 40 (l/h) registered in the initial stage.

The flow change detection unit 15 compares an average flow quantity value of 160 (l/h) determined at point B and timing "l" with an average flow quantity value of 40 (l/h) achieved at timing "k" and stored in the flow memory unit 14. When a comparison result shows that a difference flow of 120 (l/h) is a predetermined value; for instance, 10 (l/h), or more, "a change is determined to be present," and the appliance is determined to be used or stopped. Further, it is determined whether the change is incremental or decremental. The flow change occurred at point B shows an increase from 40 (l/h) to 160 (l/h); hence, an appliance is determined to be used, whereupon a difference flow of 120 (l/h) is calculated. The difference flow of 120 (l/h) is newly registered as a registered flow quantity value in the flow registration unit 16.

Use limit on the gas appliances are monitored by a total value of 160 (l/h) that is a sum of the previous registered flow quantity value of 40 (l/h) and the current registered flow quantity value of 120 (l/h).

The gas flow quantity is controlled by proportional control, and the like, from timing "p" to timing "c'" subsequent to point B, whereby the used flow quantity gradually decreases at a small rate of change. Provided that an average flow quantity value acquired at timing "p" is 155 (l/h), even when compared with an average flow quantity value of 160 (l/h) at timing "o" stored in the flow memory unit 14 by the flow change detection unit 15, the average flow quantity value acquired at timing "p" is smaller than a predetermined comparative reference value of 10 (l/h), so that a determination showing "no change" is yielded. Processing for changing the registered flow quantity value is not performed. Further, provided that an average flow quantity value acquired at timing "q" is also changed by similar proportional control and hence comes to 152 (l/h), a difference flow between this average flow quantity value and the average flow quantity value of 155 (l/h) acquired at timing "p" and stored in the flow memory unit 14 is 3 (l/h). Even when these average flow quantity values are compared with each other by the flow change detection unit 15, a similar determination result showing "no change" is yielded. Hence, processing for changing the registered flow quantity value is not performed.

As mentioned above, a result of determination made by the flow change detection unit 15 shows "no change" until timing "c'" where a small amount of change arises. Therefore, processing for changing the registered flow quantity value is not performed, and a difference flow quantity value of 120 (l/h) registered at point B is recorded as a registered flow quantity value.

However, an average flow quantity value acquired at timing "c'" is 100 (l/h), and a difference flow quantity value of 60 (l/h) is a value to be set as a registered flow quantity value conforming to an actual operating state. The objective of the present invention is to minimize a discrepancy between 120 (l/h) and 60 (l/h), to thus make the registered flow quantity value close to a flow quantity value conforming to the actual operating state.

Accordingly, in a case where the flow change detection unit 15 makes a determination showing "no change" even when there is a flow change, a second change value that is smaller than the first change value serving as a criterion of the flow change detection unit 15 is set in the change value determination unit 20. There is performed processing for making a correction to the registered flow quantity value acquired at the time of occurrence of a minute flow change by taking the second change value as a criterion.

For instance, a minute flow change appearing at timing "p" is described. An average flow quantity value acquired at timing "p" is 155 (l/h) as mentioned above. A difference flow quantity between the average flow quantity value of 155 (l/h) and an average flow quantity value of 160 (l/h) acquired at timing "o" and kept in the flow memory unit 14 comes to 5 (l/h). The difference flow becomes smaller than a first change value of 10 (l/h) set in the flow change detection unit 15, and a determination showing "no change" is made. When a signal showing "no change" is sent to the change value determination unit 20 at this time, the change value determination unit 20 compares the average flow quantity value of 155 (l/h) acquired at timing "p" with a total value of (40+120) (l/h) of flow quantities registered in the flow registration unit 16 at this point in time, whereby a difference value of 5 (l/h) is calculated. For instance, when a value of 5 (l/h) is set as a second change value, a difference value of 5 (l/h) calculated by the change value determination unit 20 comes to the second change value or more. Processing for correcting the registered flow quantity value is determined to be performed, and difference value data are output as a correction signal to the registered flow correction unit 21, to thus make a correction to the flow quantity value registered in the flow registration unit 16. In this case, when a flow quantity value of the hot water supply is taken as an object registered flow quantity value to be corrected, a value of 120 (l/h) is registered as a registered flow quantity of the hot water supply at timing "o," a value of (120-5) (l/h) is acquired as a result of performance of correction operation performed at timing "p." The flow quantity registered in the flow registration unit 16 is again registered by 40 (l/h) and 115 (l/h).

As mentioned above, even in the case of a minute flow change, the registered flow quantity value can be managed while remaining substantially equal to the average flow quantity value. It becomes possible to accurately monitor a use limit on appliances by use of the registered flow quantity value.

An explanation is now given to a case of occurrence of a flow change having a value that is smaller than the second change value. As mentioned above, the average flow quantity value acquired at timing "q" is 152 (l/h). A difference flow quantity between the average flow quantity value of 152 (l/h) and the average flow quantity value of 155 (l/h) acquired at timing "p" and stored in the flow memory unit 14 comes to 3 (l/h). The difference value is smaller than the first change value of 10 (l/h) set in the flow change detection unit 15, and a determination showing "no change" is rendered. The "no change" signal is sent to the change value determination unit 20 at this time in the same manner as mentioned above, the change value determination unit 20 compares an average flow quantity value of 152 (l/h) acquired at timing "p" with a total value of (40+115) (l/h) of flow quantities registered in the flow registration unit 16 at this point in time, thereby calculating a difference value of 3 (l/h). When; for instance, a value of 5 (l/h), is set as the second change value, the difference value of 3 (l/h) calculated by the change value determination unit 20 comes to the second change value or less, and correction operation is determined not to be performed. A transition is made to processing pertaining to the next timing "r."

Provided that an average flow quantity value acquired at timing "r" is 148 (l/h), a difference flow quantity between the average flow quantity value of 148 (l/h) and an average flow quantity value of 152 (l/h) acquired at timing "q" kept in the flow memory unit 14 comes to 4 (l/h). The difference flow is smaller than a first change value of 10 (l/h) set in the flow change detection unit 15, and a determination showing "no change" is made in this case, as well. When a signal showing "no change" is likewise sent to the change value determination unit 20 at this time, the change value determination unit 20 compares the average flow quantity value of 148 (l/h) acquired at timing "r" with a total value of (40+115) (l/h) of flow quantities registered in the flow registration unit 16 at this point in time, whereby a difference value of 7 (l/h) is calculated. For instance, when a value of 5 (l/h) is set as a second change value, a difference value of 7 (l/h) calculated by the change value determination unit 20 comes to the second change value or more. Processing for correcting the registered flow quantity value is determined to be performed, and difference value data are output as a correction signal to the registered flow correction unit 21, to thus make a correction to the flow quantity value registered in the flow registration unit 16. In this case, when a flow quantity value of the hot water supply is taken as an object registered flow quantity value to be corrected, a value of 115 (l/h) is registered as a registered flow quantity of the hot water supply at timing "q," a value of (115-7) (l/h) is acquired as a result of performance of correction operation performed at timing "r." The flow quantity registered in the flow registration unit 16 is again registered by means of 40 (l/h) and 108 (l/h).

As mentioned above, even when there is timing at which correction operation is not performed for reasons of a further minute flow change, a correction is made to the registered flow quantity value at timing when a difference between an average flow quantity value and a registered flow quantity value comes to the second change value or more. Therefore, the registered flow quantity value can be managed while remaining substantially equal to the average flow quantity value. It is possible to accurately monitor the use limit on appliances by use of the registered flow quantity value. Further, the frequency of performance of correction operation can be suppressed to an appropriate value, so that there is yielded an advantage in terms of influence on consumption of a battery.

The foregoing correction operation is iterated in the course of the flow quantity gradually changing at a small rate of change, whereby the flow quantity is registered in the flow registration unit 16 at timing "c'" by values of 40 (l/h) and 60 (l/h). When operation of the hot water supply is stopped at point C, the flow quantity registered in the flow registration unit 16 comes to 40 (l/h) by deletion processing of the flow registration unit 16 performed when the flow change detection unit 15 detects "presence of a change." The registered flow quantity coincides with an average flow quantity value of 40 (l/h) determined at timing "d'," so that the registered quantity of value can be made close to a registered flow quantity value conforming to an actual operating state.

Numerical limitations employed in the embodiment are a mere example, and a use arrangement is not limited to the embodiment.

A seventh invention is directed toward a gas cutoff apparatus that monitors operating conditions of a plurality of gas appliances connected to portions of a pipe extending from a gas meter and that cuts off a gas supply at the time of occurrence of an abnormality, the gas meter including: a flow detection unit that measures a gas flow quantity; a flow computing unit that computes a flow quantity value from a detected value of the flow detection unit; an average flow computing unit obtains an average flow quantity value by averaging, at each predetermined time, instantaneous flow quantity values computed by the flow computing unit; an average time clock unit that counts an averaging time; a flow memory unit that stores the average flow quantity value obtained by the average flow computing unit; a flow change determination unit that determines presence of a flow change when a difference between the value obtained by the average flow computing unit and a value stored in the flow memory unit is larger than a preset first change value; a flow registration unit that registers or deletes a flow quantity corresponding to the flow change in accordance with a direction of the change when the flow change determination unit determines that a change is present; a registered flow correction unit that makes a correction to a flow quantity value in the flow registration unit when a difference between a value obtained by the average flow computing unit and the recorded value in the flow memory unit is smaller than the first change value and larger than a second change value; a monitoring value memory unit that memories a determination value for monitoring an abnormality in an operating state; an abnormality determination unit that compares the flow quantity value in the flow registration unit with a corresponding determination value in the monitoring value memory unit, thereby determining presence or absence of an abnormality; and a cutoff unit that cuts off a gas supply when the abnormality determination unit has made an abnormality determination.

When the flow change determination unit has detected a flow change of predetermined level or more, it is determined whether use of an appliance is started or stopped. When use of an appliance is started, a flow quantity commensurate with the flow change is registered and set as a registered flow quantity value corresponding to a use limit on the appliance. When use of an appliance is stopped, a registered flow quantity close to the flow change is deleted, and the remaining registered flow quantity is set as being close to an actual operating state. When the flow change is small and cannot be detected by the flow change determination unit and when the flow change lies in a predetermined range, a correction is made to the registered flow quantity value by a value commensurate with the flow change. Therefore, even in a case where the gas flow quantity gradually changes at a small rate of change by proportional control, and the like, when the flow change falls within a predetermined range, a correction is made to the registered flow quantity each time, thereby enabling setting of a registered flow quantity conforming to the currently operating appliances. It is possible to provide a highly safe gas cutoff apparatus that can prevent occurrence of erroneous operation by assuring a use limit function appropriate to operating appliances.

An eighth invention is characterized in that the gas cutoff apparatus has a change value determination unit which compares an average flow quantity value obtained by the average flow computing unit with a value stored in the flow memory unit in synchronism with a countup signal of the average time clock unit; and which outputs a correction signal to the registered flow correction unit when a change of predetermined level or more is detected.

A difference between the average flow quantity value and a stored past average flow quantity value is determined for each averaging time at which an average flow quantity value is determined. When the difference has exceeded the second change value used for determining initiation of correcting operation, a correction is made to the flow quantity value in the flow registration unit by use of the difference. Hence, even when the gas flow quantity gradually changes at a small rate of change that is smaller than the first change value, a correction can be made to the registered flow quantity value at appropriate timing. The registered flow quantity can be set more accurately in agreement with the currently operating appliances. It is possible to provide a highly safe gas cutoff apparatus that can prevent occurrence of erroneous cutoff operation by assuring a use limit function appropriate to operating appliances.

A ninth invention is characterized in that the gas cutoff apparatus has a change value determination unit which compares an average flow quantity value obtained by the average flow computing unit with a value stored in the flow memory unit in synchronism with a countup signal of the average time clock unit; a change value memory unit that stores in time sequence a result of comparison made by the change value determination unit; and a cumulative change determination unit that outputs a correction signal to the registered flow correction unit when an integrated value of change values stored in the change value memory unit has exceeded predetermined value.

A difference between the average flow quantity value and a stored past average flow quantity value is determined and recorded as a change value at each averaging time at which an average flow quantity value is determined. When an integrated value of the change values has exceeded the second change value used for determining initiation of correcting operation, a correction is made to the flow quantity value in the flow registration unit by use of the change value. Hence, even when the gas flow quantity gradually changes at a small rate of change that is smaller than the second change value, a correction can be made to the registered flow quantity value at appropriate timing. The registered flow quantity can be set more accurately in agreement with the currently operating appliances. It is possible to provide a highly safe gas cutoff apparatus that can prevent occurrence of erroneous cutoff operation by assuring a use limit function appropriate to operating appliances.

A tenth invention is characterized in that the change value in the change value memory unit is deleted when the registered flow correction unit has performed operation for correcting a flow quantity value.

Data in the change value memory unit are initialized when processing for correcting a registered flow quantity value are initialized, whereby unwanted data can be deleted. Correction operation for a case where a change arises at a smaller rate of change can be performed by assuring a comparatively small memory size.

An embodiment of the present invention is hereinbelow described by reference to the drawings. The present invention is not limited to the embodiment.

(Fourth Embodiment)

Figure 12:
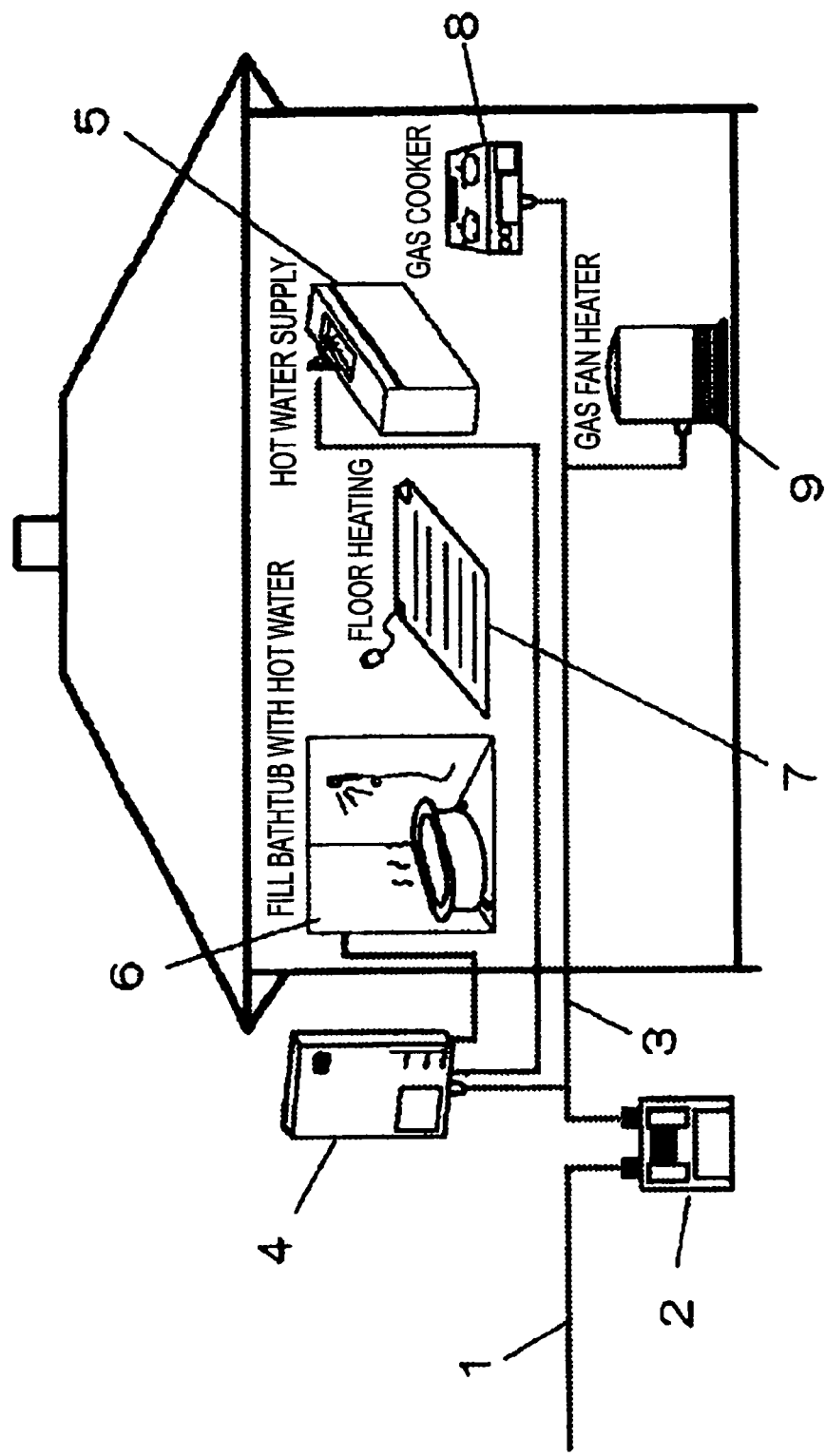
[FIG. 12] It is a view showing a mode of installation of a gas cutoff apparatus and a gas appliance of a fourth embodiment of the present invention.
Figure 13:
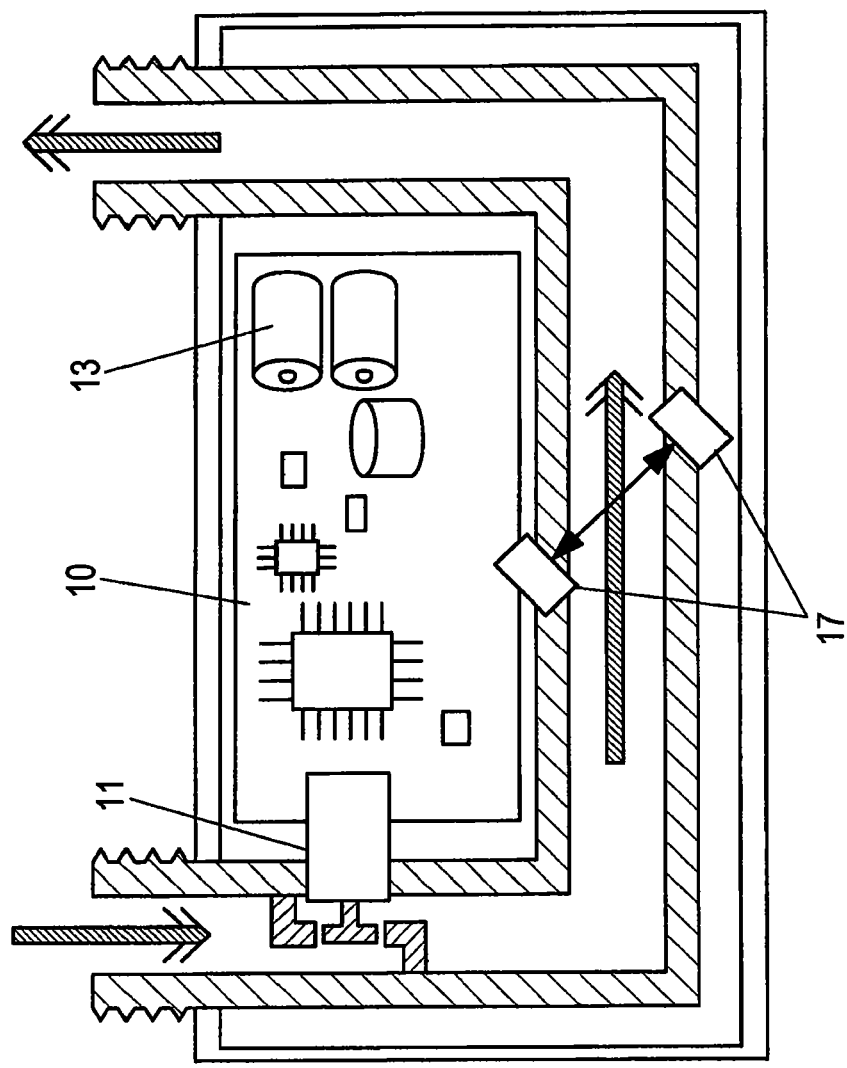
[FIG. 13] It is an internal schematic diagram of the gas cutoff apparatus.
Figure 14:
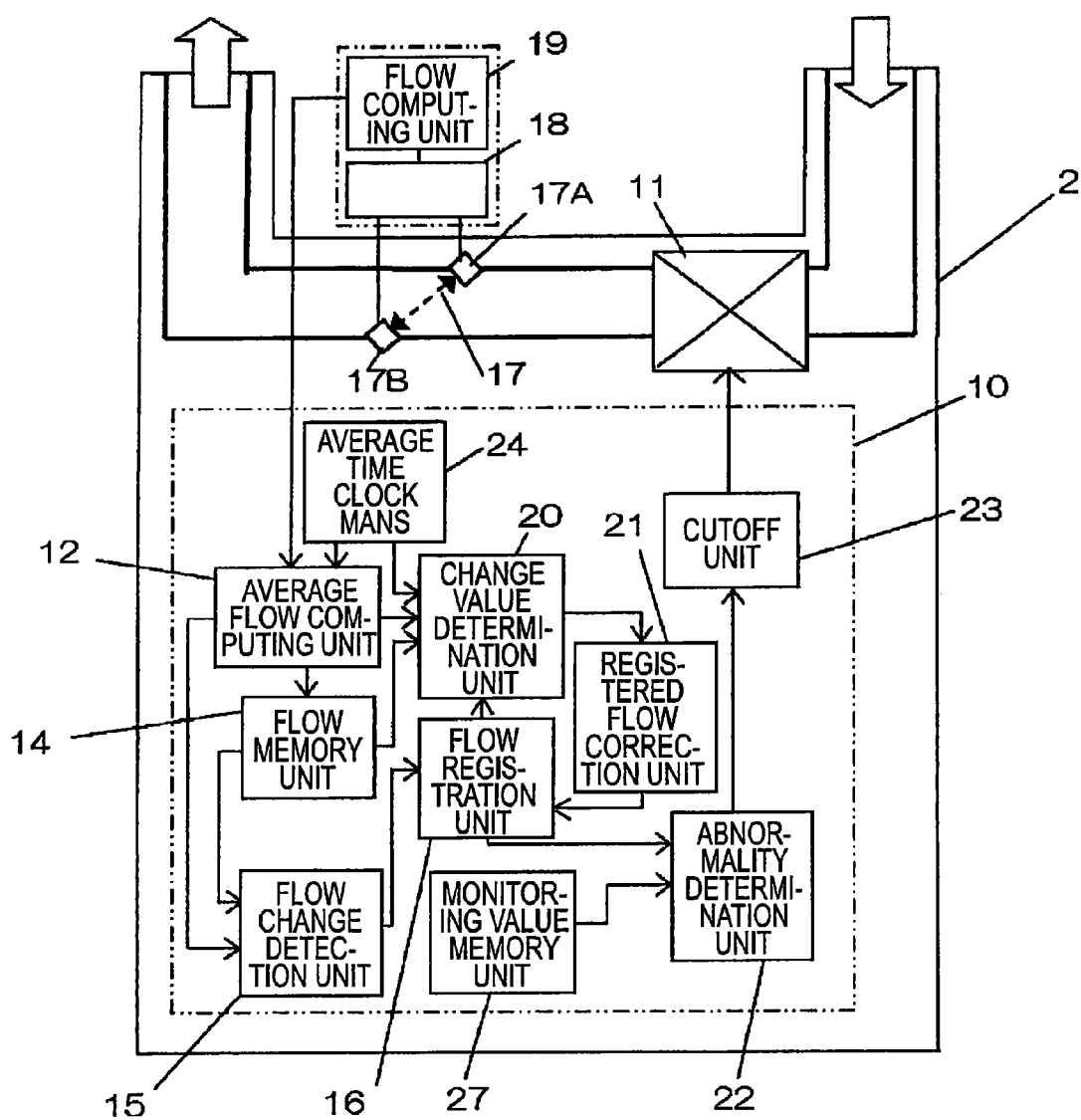
[FIG. 14] It is a control block diagram of the gas cutoff apparatus.

FIG. 12 is a view showing a mode of installation of a gas cutoff apparatus and gas appliances of a fourth embodiment of the present invention, FIG. 13 is an internal schematic diagram of the gas cutoff apparatus, and FIG. 14 is a control block diagram of the gas cutoff apparatus.

The gas meter 2 is installed at the entrance of the gas supply line 1 of an individual household. The gas pipe 3 extending from the gas meter 2 branches to locations where various gas appliances used in the household are installed, and gas is supplied by way of the pipe. For example, the gas hot water supply 4 is installed outdoors. Hot water produced by the gas hot water supply 4 is supplied, by way of a water pipe, to the hot water faucet 5 of a kitchen, a bathroom 6 where a bathtub or a shower unit is installed, a floor heating 7 set in a living room, and the like. Thus, various use arrangements are realized.

In the interior of a house, gas is supplied to the gas cooker 8 installed in the kitchen and the gas fan heater 9 set in the living room, a bedroom, and others. The gas appliances are used, as required, according to the circumstances.

When gas is consumed as a result of use of any of the thus-installed gas appliances, the gas meter 2 measures the quantity of gas used, and data are cumulatively recorded at predetermined time period. After subjected to predetermined information processing in accordance with a periodic data request command from a gas service provider, the data stored in the gas meter 2 is transmitted to customers and a gas utility company as information, such as a gas charge, the quantity of gas used, or discount service offered by the gas utility company.

A gas passageway having a gas inlet and a gas outlet is formed in the gas meter 2. Disposed in the gas passageway are the cutoff valve 11 for cutting off gas in case of an abnormality and the pair of ultrasonic sensors 17a and 17b serving as a flow detection unit 17 for measuring the gas flow quantity. Further, the gas meter has a built-in control circuit 10 made up of a flow computing unit 19 that computes the gas flow quantity from a signal from the flow detection unit 17 and an average flow computing unit 12 that aggregates and averages the thus-computed instantaneous flow quantity value for a predetermined time period clocked by an average time clock unit 24, to thus compute an average flow quantity value. Further, the gas meter houses a battery 13 for driving the control circuit 10.

Various types are available for the flow detection unit. For instance, one type is to transmit an ultrasonic signal by a pair of ultrasonic sensors disposed in the passageway described in connection with the present embodiment from one sensor to the other and detect the quantity of gas used in accordance with a propagation time consumed by transmission. Another type is to place a hot wire sensor in the passageway and determine the flow quantity from impedance that changes in accordance with a flow. Still another type is to detect the quantity of gas by a measurement membrane and convert mechanical action of the measurement membrane into an electric pulse signal by a magnet, a lead switch, or a magnetoresistance element, or the like, thereby detecting the flow quantity. A gas meter adopting a gas cutoff cutoff apparatus using an ultrasonic sensor as a flow detection unit is described in connection with the present embodiment.

Accordingly, the flow detection unit 17 using the ultrasonic sensors 17a and 17b is first, briefly descried. A first transceiver 17A for transmitting or receiving an ultrasonic wave and a second transceiver 17B for receiving or transmitting the same are disposed along a direction of flow. The transceivers can be toggled between a transmission mode and a receiving mode by a measurement control section 18 having a switching unit making up the control circuit 10, and a flowing state of a fluid, such as gas, is detected. The flow quantity is measured by processing signals from the first transceiver 17A and the second transceiver 17B. Specifically, the measurement control section 18 first drives the first transceiver 17A, thereby transmitting an ultrasonic wave toward the second transceiver 17B; namely, from an upstream position toward a downstream position. A signal received by the second transceiver 17B is amplified by an amplifying unit provided in the measurement control section 18. The thus-amplified signal is compared with a reference signal. After detection of a signal that is the reference signal or more, the transmission and receiving operations mentioned above are repeated a predetermined number of times by a repetition unit provided in the measurement control section 18. Resultant time values are respectively measured by a clock unit, such as a timer counter, provided in the measurement control section 18.

The measurement control section 18 having the switching unit toggles between the transmission operation of the first transceiver 17A and the receiving operation of the second transceiver 17B, thereby transmitting an ultrasonic signal from the second transceiver 17B toward the first transceiver 17A; namely, from the downstream position toward the upstream position. Transmission is iterated as mentioned previously, and resultant time values are respectively measured. In consideration of the size of the passageway and the flowing state of a fluid, a signal processing unit 19 making up the flow computing unit determines a flow quantity value from a difference between the propagation time of the ultrasonic wave from the first transceiver 17A and the propagation time of the ultrasonic wave from the second transceiver 17B. Flow data are determined at predetermined periods as an instantaneous flow quantity value.

Instantaneous flow quantity values determined at predetermined periods are input to the average flow computing unit 12, where instantaneous flow quantity values are aggregated and averaged for an averaging time clocked by the average time clock unit 24, to thus be calculated as an average flow quantity value. The average flow quantity value is recorded in time sequence in a flow memory unit 14. A flow change detection unit 15 compares the thus-kept average flow quantity value with the average flow quantity value calculated by the average flow computing unit 12, thereby determining whether or not a change of predetermined value or more is present. Thus, it is determined whether or not use of an appliance is started. For instance, when the customer uses the hot water supply 4, the flow quantity value changes from zero to a predetermined flow quantity. Alternatively, when the hot water supply 4, or the like, is used in the course of use of another appliance, a determination is made, on the basis of the determined average flow and the flow quantity values kept in the past, as to whether or not a rate of flow change or the amount of flow change is a predetermined level or greater, whereby it is determined whether the appliance is used or stopped.

When the flow change detection unit 15 detects a change value of predetermined level or more, an appliance is determined to be used or stopped. Specifically, when an appliance is used, the amount of flow change is registered in a flow registration unit 16, to thus be set as a registered flow quantity value. In this case, every time an incremental flow change is detected, an appliance is determined to be additionally used. The flow change is newly registered and set as a registered flow quantity value each time. On the contrary, when use of an appliance is stopped, a registered flow quantity value close to the flow change among the flow quantity values registered in the flow registration unit 16 is deleted. Likewise, even in deletion processing, every time a decremental flow change is detected, use of an appliance is determined to be stopped, and processing for deleting a corresponding registered flow quantity value is performed each time.

In synchronism with an averaging time clocked by the average time clock unit 24, the change value determination unit 20 compares the past average flow quantity value stored in the flow memory unit 14 with the average flow quantity value. When a comparison result is smaller than the first change value that is a criterion of the flow change detection unit 15 and that is greater than a predetermined second change value, the gas flow is controlled by proportional control, and the like, whereby the gas flow is determined to change at a small rate of change. A correction signal is then sent to the registered flow correction unit 21, thereby correcting the flow quantity value registered in the flow registration unit 16 and resetting the registered flow quantity so as to conform to the currently operating appliances.

Operating appliances are monitored by the reset, registered flow quantity. In this case, there is provided a monitoring value memory unit 27 in which there are stored an appliance continual use time limit corresponding to a flow zone, a reference value for monitoring a value of the maximum used flow quantity, and the like; and that has a preset total flow cutoff value for use in monitoring the state of such an abnormally-large flow quantity, which would otherwise arise; for example, when a hose used for supplying gas to an operating appliance, such as a space heater, is disconnected for any reason and a preset operating time cutoff time limit for specifying an operating time limit for a case where an appliance is used for a time period that is much longer than the maximum period of operating time during which the appliance is usually used. An abnormality determination unit 22 ascertains the preset values and the registered flow quantity value in the flow registration unit 16, thereby enabling making of a determination as to whether or not the registered flow quantity value exceeds a value of the maximum used flow quantity, whether or not the appliance operating time exceeds an appliance continual use time limit corresponding to the registered flow quantity value, and the like. When detected an abnormality, the abnormality determination unit 22 sends a signal to a cutoff unit 23, thereby activating the cutoff valve 11 to suspend a gas supply. A cutoff state and specifics of a cutoff state are displayed on a liquid-crystal display element, or the like, and also reported to a center that monitors the safety of gas through a communication unit, and the like.

Operation of the gas cutoff apparatus configured as mentioned above is now described. When gas appliances installed in the customer's house; for instance, the gas space heater 9, the hot water supply 4, and the like, are used, the flow detection unit 17 detects flow quantities of the appliances. When; for instance, an ultrasonic sensor, is used, a propagation time of an ultrasonic signal is measured as a detected value. The signal is sent to the flow computing unit 19, where the signal is calculated as an instantaneous flow quantity value. The average flow computing unit 12 computes an average flow quantity value from instantaneous flow quantity values for each averaging time clocked by the average time clock unit 24. A plurality of the thus-determined average flow quantities are periodically stored in time sequence in the flow memory unit 14. From flow quantities stored in the flow memory unit 14 in the past (e.g., the flow quantity kept last time, the flow quantity kept last but one, the flow quantity kept "n" times before, and the like), it is determined whether or not a flow change is present. Specifically, it is determined whether the appliance is used or stopped from the state of the change and by use of the average flow quantity value output at predetermined intervals. The amount of flow change acquired at the time of occurrence of the change is taken as a registered flow quantity for the operating appliance. The flow quantity is newly registered in the flow registration unit 16, or the already-registered flow quantities are deleted, whereby the registered flow quantities corresponding to the appliances operating at the point in time of occurrence of the change can be accurately set.

For instance, when the user uses the hot water supply 4, the flow quantity changes to an arbitrary flow level in a case where the flow quantity registered in the past is zero. The change is determined as a flow change from an average flow quantity and the flow quantity acquired in the past. When a rate of change or the amount of change is a predetermined level or more, the change is determined to be present; namely, an appliance of some kind is registered in the flow registration unit 16 as being currently used. Alternatively, when the hot water supply 4 is used in the course of use of the gas cooker 8, the flow quantity of the gas cooker 8 is recorded in the past flow quantity in the flow memory unit 14. The flow change detection unit 15 determines a flow change from the current average flow quantity and the flow quantity value stored in the past. Likewise, when a rate of change or the amount of flow change from the current flow quantity is a predetermined level or more, the change is determined to be present, and the flow change is registered in the flow registration unit 16. When any appliance is stopped in the course of use of a plurality of appliances or when a change arises in flow quantity, as well as when the number of appliances being used is increased, the flow change detection unit 15 determines, from the flow quantities stored in the past and the average flow quantity, whether or not the change is a decremental change, and outputs a decremental flow change. The flow registration unit 16 deletes or reduces a registered flow quantity value closest to the decremental flow change among the registered flow quantities.

However, in a mode of operation of the hot water supply 4; particularly, in a case where the hot water supply is used for floor heating, and the like, the amount of combustion greatly changes between when load exerted on the hot water supply in its early stage of operation is large and when load exerted on the hot water supply in its stable state is small. In such a case, a flow change is determined to be present in the early stage of operation of the hot water supply, and use of the hot water supply 4 is determined. An average flow quantity value achieved at this point in time is registered in the flow registration unit 16 as a registered flow quantity. When operation is continually carried out, heating load is gradually decreased, whereupon the amount of combustion or the gas flow quantity is controlled in a decreasing manner by means of proportional control. Since the amount of change achieved at this time is smaller than the determination value set by the flow change detection unit 15; for instance, the first change value, only the average flow quantity value gradually decreases without a flow change being determined to be present. The flow quantity registered in the flow registration unit 16 is recorded while remaining set in the early stage.

Specifically, a difference between the registered flow quantity value and the average flow quantity value greatly increases with elapse of time. When the hot water supply 4 is stopped as a result of the heating load being saturated in this state, the flow change detection unit 15 determines that a flow change is present. The amount of flow change achieved at this time is deleted from the flow quantity registered in the flow registration unit 16. However, the average flow quantity value achieved when the hot water supply 4 is stopped has already become considerably small by proportional control. Therefore, the flow change has also become decreased as compared with that achieved in the early stage. Even when the thus-decreased flow change is deleted from the registered flow quantity, a certain degree of value is left as the registered flow quantity. Existing, registered flow quantities of the appliances that are not actually used also act as registered flow quantities to be compared with the preset value of the monitoring value memory unit 21 by the abnormality determination unit 22. Specifically, operating appliances are monitored by a registered flow quantity whose value is greater than values of the registered flow quantities of the actually-operating appliances. Problems, such as a problem of the cutoff valve 11 erroneously performing cutoff operation within an unexpected short time period as a result of shortening of the continual operation time limit, arise.

Accordingly, in the present invention, the change value determination unit 20 compares the average flow quantity value obtained by the average flow computing unit 12 with the past average flow quantity value stored in the flow memory unit 14 in synchronism with a countup signal from the average time clock unit 24 that clocks an averaging time used for determining an average flow quantity value, in relation to a flow change that is equal to or less than the first change value for which the flow change detection unit 15 cannot detect "existence of a flow change." When a comparison result shows that the difference between the average flow quantity value and the value stored in the flow memory unit 14 is a preset second change value or more, a correction signal is sent to the registered flow correction unit 21, thereby making a correction to the flow quantity value registered in the flow registration unit 16 by use of the difference value determined by the change value determination unit 20. In the present invention, no reference is made to which one of registered flow quantity values is corrected in the series of correction processing operations mentioned above when there are the plurality of registered flow quantity values. However, for instance, an appliance determination unit that specifies an appliance from the state of a change may also be provided; an operation signal may also be acquired directly from an appliance; or an appliance to be subjected to flow change may also be specified by still another means.

As mentioned above, when the flow change determination unit 15 has detected a flow change of first change value or more, it is determined whether use of an appliance is started or stopped. When use of an appliance is started, a flow quantity corresponding to a flow change is registered and set as a registered flow quantity corresponding to a use limit on the appliance. When use of an appliance is stopped, the registered flow quantity close to the flow change is deleted, to thus set the registered flow quantity close to an actual operating state. When the flow change is small and cannot be detected by the flow change determination unit 15 and when the flow change lies in a predetermined range; namely, when the flow change is smaller than the first change value and larger than the second change value, a correction is made to the registered flow quantity value by the flow quantity corresponding to the flow change. Therefore, even in a case where the gas flow quantity gradually changes at a small rate of change by proportional control, and the like, when the flow change falls within the predetermined range, a correction is made to the registered flow quantity each time, so that a registered flow quantity conforming to the currently operating appliances can be set. It is possible to provide a highly safe gas cutoff apparatus that can prevent occurrence of erroneous cutoff operation by assuring an appropriate operation limit function corresponding to an operating appliance.

Figure 15:
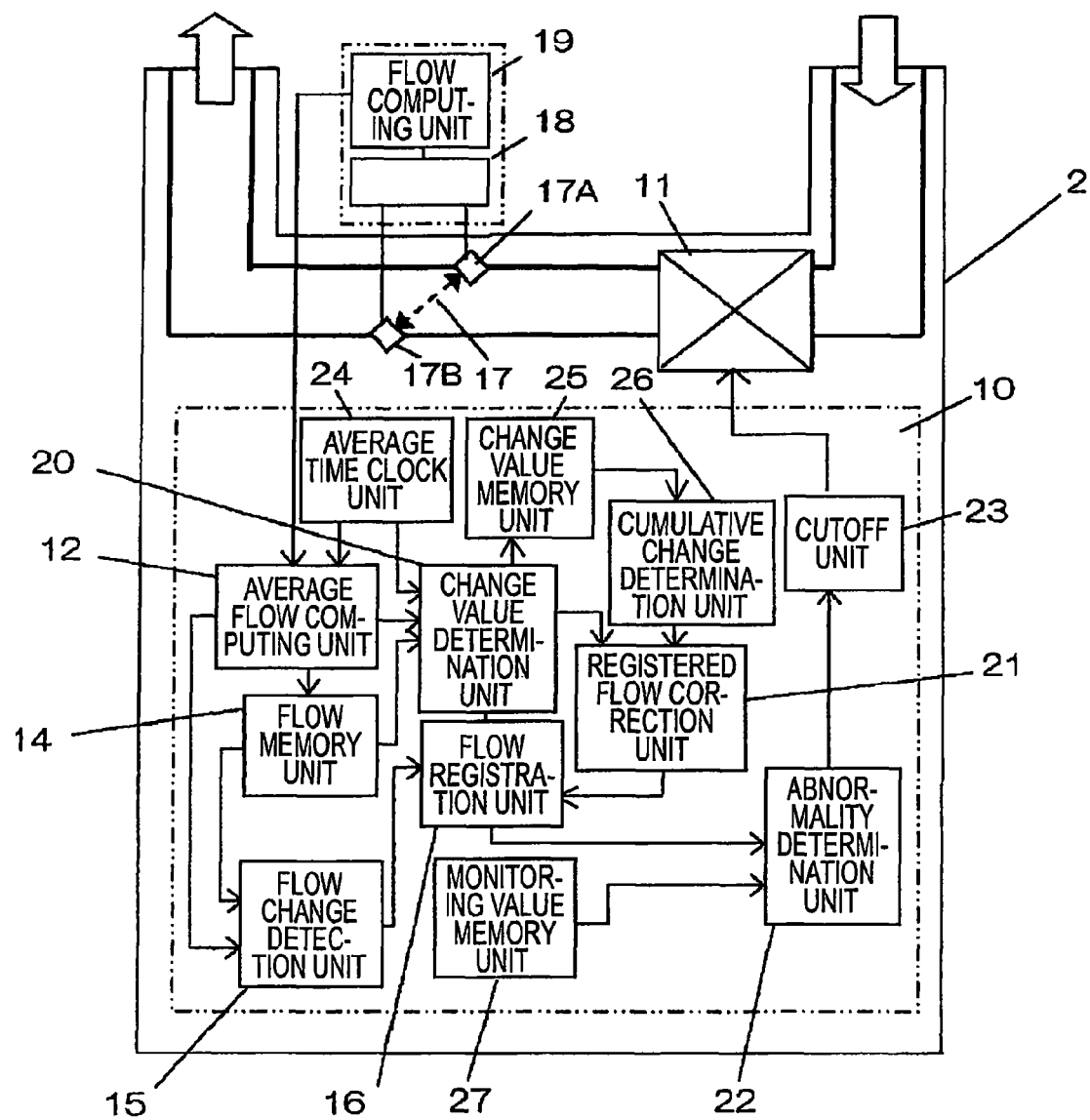
[FIG. 15] It is another control block diagram of the gas cutoff apparatus.

Another embodiment shown in FIG. 15 also has the change value determination unit 20 that compares the average flow quantity value obtained by the average flow computing unit 12 with the past average flow quantity value stored in the flow memory unit 14 in synchronism with a countup signal from the average time clock unit 24, in relation to a flow change that is equal to or less than the first change value for which the flow change detection unit 15 cannot detect "existence of a flow change"; a change value memory unit 25 that stores in time sequence a result of comparison performed by the change value determination unit 20; and a cumulative change determination unit 26 that outputs a correction signal to the registered flow correction unit 21 when an integrated value of the change values stored in the change value memory unit 25 has exceeded a predetermined value. A difference between the average flow quantity value and the value stored in the flow memory unit 14 is determined as a change value every averaging time at which an average flow quantity value is determined, and the thus-determined change value is stored. When an integrated value of the change values has exceeded the second change value by means of which initiation of correction operation is determined, a correction is made to the flow quantity value in the flow registration unit 16 by use of the change value. Therefore, even in a case where the gas flow quantity gradually changes at a rate of change smaller than the second change value, a correction can be made to the registered flow quantity at appropriate timing, so that the registered flow quantity can be set more accurately in agreement with the currently operating appliances. It is possible to provide a highly safe gas cutoff apparatus that can prevent occurrence of erroneous cutoff operation by assuring an appropriate operation limit function corresponding to an operating appliance.

Further, when the registered flow correction unit 21 has performed processing for correcting a registered flow quantity value, data in the change value memory unit 25 are initialized, whereby unwanted data can be deleted. Correction operation for a case where a change arises at a smaller rate of change can be performed by assuring a comparatively small memory size.

Figure 16:
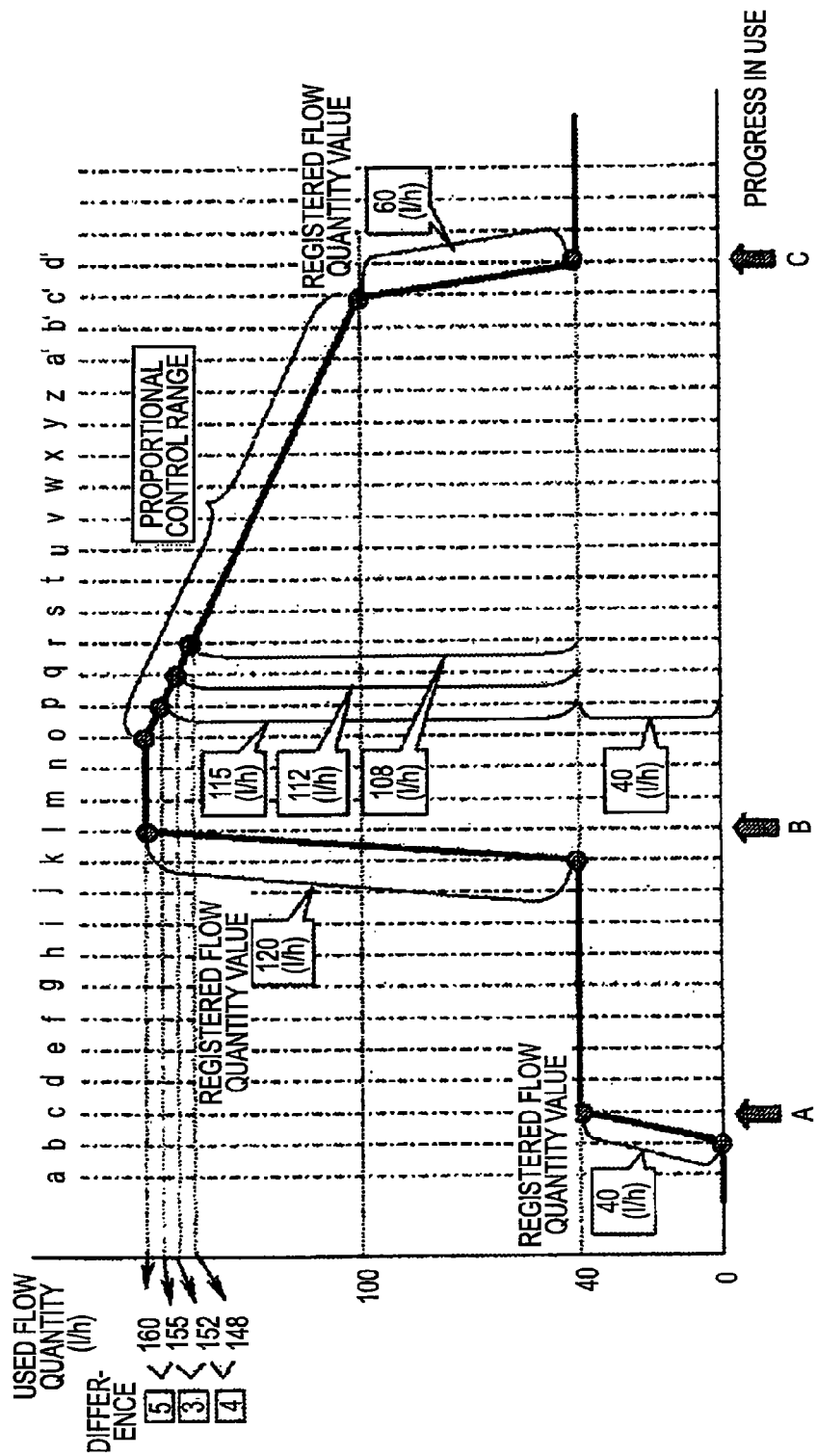
[FIG. 16] It is a view for explaining operation of the gas cutoff apparatus for making a correction to a registered flow quantity.
Figure 17:
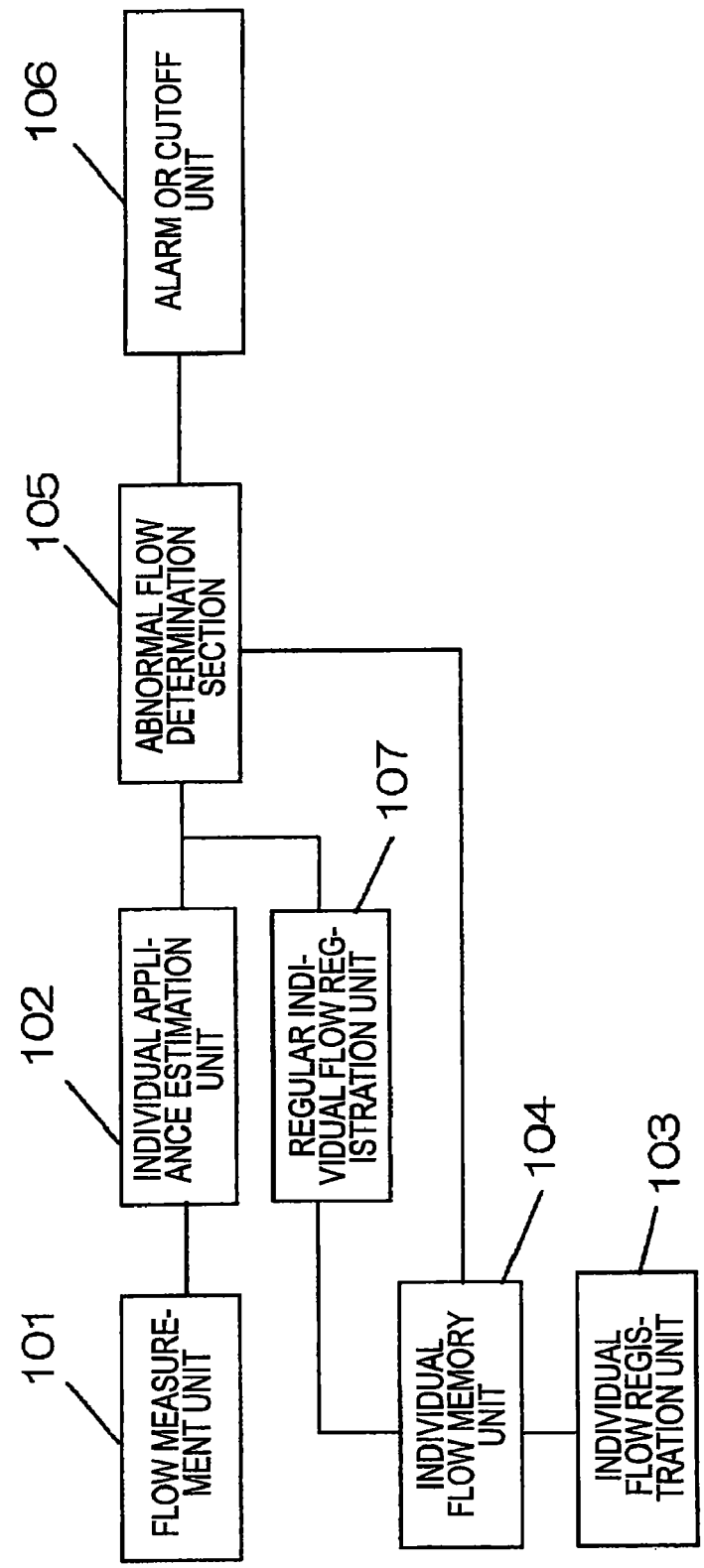
[FIG. 17] It is a control block diagram of a related art gas cutoff apparatus.

The correcting operation mentioned above is now described in more detail by reference to FIG. 16. A vertical axis represents the used flow quantity (l/h), and a horizontal axis represents progress in use. Thus, a use arrangement of appliances is illustrated. By way of example, the drawing shows the following state. For instance, a gas space heater is used at point A, and the used flow quantity changes from 0 (l/h) to 40 (l/h). In order to use; for instance, a floor heating, at point B, a hot water supply starts operating, and the used flow quantity changes from 40 (l/h) to 160 (l/h). Subsequently, the amount of combustion of a hot water supply is controlled by proportional control in accordance with a change in heating load, whereby the used flow quantity gradually decreases. Combustion of the hot water supply is stopped at point C where the used flow quantity has decreased to 100 (l/h), and the used flow quantity decreases to 40 (l/h).

Operation of the control circuit 10 that performs appliance monitoring function in the above use arrangement is described. The flow detection unit 17 and the flow computing unit 19 detect the gas used flow quantity as an instantaneous flow quantity value. Instantaneous flow quantity values are aggregated or averaged for a predetermined time period clocked by the average time clock unit 24, whereby the instantaneous flow quantity values are computed as an average flow quantity value at timings of "a," "b," "c," . . . "a'," "b", "c'," and "d'," and the thus-computed average flow quantity values are stored in the flow memory unit 14.

The flow change detection unit 15 compares an average flow quantity value of 40 (l/h) determined at timing "c" and at point A with an average flow quantity value of 0 (l/h) that has been achieved at timing "b" and recorded in the flow memory unit 14. When a comparison result shows that a difference flow quantity is a predetermined value; for instance, 10 (l/h), or more, "a change is determined to be present," and the appliance is determined to be used or stopped. Further, it is determined whether the change is incremental or decremental. In the case of the use arrangement shown in FIG. 16, a change shows an increase from 0 (l/h) to 40 (l/h); hence, an appliance is determined to be used, and a difference flow of 40 (l/h) is calculated. The difference flow of 40 (l/h) is newly registered as a registered flow quantity value in the flow registration unit 16. A restriction on use of the gas appliances is monitored by the registered flow quantity value until a subsequent flow change occurs. In the use arrangement shown in FIG. 16, the average flow quantity value does not change from timing "c" to timing "k." Hence, the registered flow quantity value remains at a difference flow of 40 (l/h) registered in the initial stage.

The flow change detection unit 15 compares an average flow quantity value of 160 (l/h) determined at point B and timing "l" with an average flow quantity value of 40 (l/h) achieved at timing "k" and stored in the flow memory unit 14. When a comparison result shows that a difference flow of 120 (l/h) is a predetermined value; for instance, 10 (l/h), or more, "a change is determined to be present," and the appliance is determined to be used or stopped. Further, it is determined whether the change is incremental or decremental. The flow change occurred at point B shows an increase from 40 (l/h) to 160 (l/h); hence, an appliance is determined to be used, and a difference flow of 120 (l/h) is calculated. The difference flow of 120 (l/h) is newly registered as a registered flow quantity value in the flow registration unit 16.

Use limit on the gas appliances are monitored by a total value of 160 (l/h) that is a sum of the previous registered flow quantity value of 40 (l/h) and the current registered flow quantity value of 120 (l/h).

The gas flow quantity is controlled by proportional control, and the like, from timing "p" to timing "c" subsequent to point B, whereby the used flow quantity gradually decreases at a small rate of change. Provided that an average flow quantity value acquired at timing "p" is 155 (l/h), even when compared with an average flow quantity value of 160 (l/h) at timing "o" stored in the flow memory unit 14 by the flow change detection unit 15, the average flow quantity value acquired at timing "p" is smaller than a predetermined comparative reference value of 10 (l/h), so that a determination showing "no change" is yielded. Processing for changing the registered flow quantity value is not performed. Further, provided that an average flow quantity value acquired at timing "q" is also changed by similar proportional control and hence comes to 152 (l/h), a difference flow between this average flow quantity value and the average flow quantity value of 155 (l/h) acquired at timing "p" and stored in the flow memory unit 14 is 3 (l/h). Even when these average flow quantity values are compared with each other by the flow change detection unit 15, a similar determination result showing "no change" is yielded. Hence, processing for changing the registered flow quantity value is not performed.

As mentioned above, a result of determination made by the flow change detection unit 15 shows "no change" until timing "c" where a small amount of change arises. Therefore, processing for changing the registered flow quantity value is not performed, and a difference flow quantity value of 120 (l/h) registered at point B is recorded as a registered flow quantity value.

However, an average flow quantity value acquired at timing "c" is 100 (l/h), and a difference flow quantity value of 60 (l/h) is a value to be set as a registered flow quantity value conforming to an actual operating state. The objective of the present invention is to minimize a discrepancy between 120 (l/h) and 60 (l/h), to thus make the registered flow quantity value close to a flow quantity value conforming to the actual operating state.

Accordingly, in a case where the flow change detection unit 15 makes a determination showing "no change" even when there is a flow change, a second change value that is smaller than the first change value serving as a criterion of the flow change detection unit 15 is set in the change value determination unit 20. There is performed processing for making a correction to the registered flow quantity value acquired at the time of occurrence of a minute flow change by taking the second change value as a criterion.

For instance, a minute flow change appearing at timing "p" is described. An average flow quantity value acquired at timing "p" is 155 (l/h) as mentioned above. A difference flow quantity between the average flow quantity value of 155 (l/h) and an average flow quantity value of 160 (l/h) acquired at timing "o" kept in the flow memory unit 14 comes to 5 (l/h). The difference flow becomes smaller than a first change value of 10 (l/h) set in the flow change detection unit 15, and a determination showing "no change" is made. When a signal showing "no change" is sent to the change value determination unit 20 at this time, the change value determination unit 20 compares the average flow quantity value of 155 (l/h) acquired at timing "p" with an average flow quantity value of 160 (l/h) acquired at timing "o" and stored in a flow memory unit 14, whereby a difference value of 5 (l/h) is calculated. For instance, when a value of 5 (l/h) is set as a second change value, a difference value of 5 (l/h) calculated by the change value determination unit 20 comes to the second change value or more. Processing for correcting the registered flow quantity value is determined to be performed, and difference value data are output as a correction signal to the registered flow correction unit 21, to thus make a correction to the flow quantity value registered in the flow registration unit 16. In this case, when a flow quantity value of the hot water supply is taken as an object registered flow quantity value to be corrected, a value of 120 (l/h) is registered as a registered flow quantity of the hot water supply at timing "o," a value of (120-5) (l/h) is acquired as a result of performance of correction operation performed at timing "p." The flow quantity registered in the flow registration unit 16 is again registered by 40 (l/h) and 115 (l/h).

As mentioned above, even in the case of a minute flow change, the registered flow quantity value can be managed while remaining substantially equal to the average flow quantity value. It becomes possible to accurately monitor a use limit on appliances by use of the registered flow quantity value.

An explanation is now given to a case of occurrence of a flow change having a value that is smaller than the second change value. As mentioned above, the average flow quantity value acquired at timing "q" is 152 (l/h). A difference flow quantity between the average flow quantity value of 152 (l/h) and the average flow quantity value of 155 (l/h) acquired at timing "p" and stored in the flow memory unit 14 comes to 3 (l/h). The difference value is smaller than the first change value of 10 (l/h) set in the flow change detection unit 15, and a determination showing "no change" is rendered. The "no change" signal is sent to the change value determination unit 20 at this time in the same manner as mentioned above, the change value determination unit 20 compares an average flow quantity value of 152 (l/h) acquired at timing "p" with an average flow quantity value of 155 (l/h) that has been acquired at timing "p" and recorded in the flow memory unit 14, thereby calculating a difference value of 3 (l/h). When; for instance, a value of 5 (l/h), is set as the second change value, the difference value of 3 (l/h) calculated by the change value determination unit 20 comes to the second change value or less, and correction operation is determined not to be performed. The difference value of 3 (l/h) is recorded in the change value memory unit 25, and a transition is made to processing pertaining to the next timing "r."

Provided that an average flow quantity value acquired at timing "r" is 148 (l/h), a difference flow quantity between the average flow quantity value of 148 (l/h) and an average flow quantity value of 152 (l/h) acquired at timing "q" kept in the flow memory unit 14 comes to 4 (l/h). The difference flow is smaller than a first change value of 10 (l/h) set in the flow change detection unit 15, and a determination showing "no change" is made in this case, as well. When a signal showing "no change" is likewise sent to the change value determination unit 20 at this time, the change value determination unit 20 compares the average flow quantity value of 148 (l/h) acquired at timing "r" with an average flow quantity value of 152 (l/h) acquired at timing "q" and stored in a flow memory unit 14, whereby a difference value of 4 (l/h) is calculated. For instance, when a value of 5 (l/h) is set as a second change value, a difference value of 4 (l/h) calculated by the change value determination unit 20 comes to the second change value or less. Processing for correcting the registered flow quantity value is determined not to be performed. The difference value of 4 (l/h) is recorded in the change value memory unit 25.

A difference value of 3 (l/h) acquired at timing "q" and a difference value of 4 (l/h) acquired at timing "r" are recorded in the change value memory unit 25 at this point in time, whereby a value of 7 (l/h) is stored as an integrated value. The cumulative change determination unit 26 compares an integrated value of 7 (l/h), which is an integration of the difference values, with the second change value of 5 (l/h). When the integrated value of the difference value has exceeded the second change value, data pertaining to the integration of the difference values are output as a correction signal to the registered flow correction unit 21, whereby the flow quantity value registered in the flow registration unit 16 is corrected. In this case, when a flow quantity value of the hot water supply is taken as an object registered flow quantity value to be corrected, a value of 115 (l/h) is registered as a registered flow quantity of the hot water supply at timing "q," a value of (115-7) (l/h) is acquired as a result of performance of correction operation performed at timing "r." The flow quantity registered in the flow registration unit 16 is again registered by 40 (l/h) and 108 (l/h).

As mentioned above, even when there is timing at which correction operation is not performed for reasons of a further minute flow change, a correction is made to the registered flow quantity value at timing when an integrated value of the difference between an average flow quantity value and a value stored in the flow memory unit 14 comes to the second change value or more. Therefore, the registered flow quantity value can be managed while remaining substantially equal to the average flow quantity value. It is possible to accurately monitor the use limit on appliances by use of the registered flow quantity value. Further, the frequency of performance of correction operation can be suppressed to an appropriate value, so that there is yielded an advantage in terms of influence on consumption of a battery.

The foregoing correction operation is iterated in the course of the flow quantity gradually changing at a small rate of change, whereby the flow quantity is registered in the flow registration unit 16 at timing "c'" by values of 40 (l/h) and 60 (l/h). When operation of the hot water supply is stopped at point C, the flow quantity registered in the flow registration unit 16 comes to 40 (l/h) by deletion processing of the flow registration unit 16 performed when the flow change detection unit 15 detects "presence of a change." The registered flow quantity coincides with an average flow quantity value of 40 (l/h) determined at timing "d'," so that the registered quantity of value can be made close to a registered flow quantity value conforming to an actual operating state.

Numerical limitations employed in the embodiment are a mere example, and a use arrangement is not limited to the embodiment.

The present patent application is based on Japanese Patent Application (JP-A-2007-182928) filed on Jul. 12, 2007 in Japan, contents of which are incorporated herein by reference.

INDUSTRIAL APPLICABILITY

As mentioned above, a gas cutoff apparatus of the present invention can appropriately assure a function of limiting use of appliances that cause variations in quantities of gas used and can be applied to general appliance monitoring apparatus.

The invention claimed is:

1. A gas cutoff apparatus that monitors operating conditions of a plurality of gas appliances connected to portions of a pipe extending from a gas meter and that cuts off a gas supply at the time of occurrence of an abnormality, the gas meter including: a flow detection unit that measures a gas flow quantity;

a flow computing unit that computes a flow quantity value from a detected value of the flow detection unit;

an average flow computing unit that obtains an average flow quantity value by averaging instantaneous flow quantity values computed by the flow computing unit;

a flow storage unit that stores the average flow quantity value obtained by the average flow computing unit;

a flow change determination unit that determines presence of a flow change from the value obtained by the average flow computing unit and a value stored in the flow storage unit when a flow change is larger than a predetermined change value;

a flow registration unit that registers a flow quantity corresponding to the flow change when the flow change determination unit has determined an incremental change and that deletes a registered flow quantity close to the flow quantity corresponding to the flow change when the flow change determination unit has determined a decremental change;

a flow memory unit that stores a flow quantity registered in the flow registration unit;

a flow change correction memory unit that, in a case where a plurality of flow quantities registered in the flow registration unit when the flow change determination unit has determined presence of a change are deleted and where only the maximum flow quantity is registered, determines whether or not a sum of the registered flow quantities deleted in the past and an average flow fall within a predetermined range;

a determination period unit that, when the plurality of flow quantities recorded in the past and the average flow are determined to have undergone no flow change for a predetermined time period by an output signal from the flow change correction memory unit, deletes and performs re-registration of the plurality of flow quantities in the flow memory unit and the registered flow quantity;

a monitoring value memory unit that memorizes a determination value for monitoring an abnormality in an operating state;

an abnormality determination unit that compares the flow quantity value in the flow registration unit with the determination value of the monitoring value memory unit, thereby determining presence or absence of an abnormality; and an operating time correction unit that outputs an operating time correction signal to the abnormality determination unit when the determination period unit has performed re-registration; and a cutoff unit that cuts off a gas supply when the abnormality determination unit has made an abnormality determination.

2. A gas cutoff apparatus that monitors operating conditions of a plurality of gas appliances connected to portions of a pipe extending from a gas meter and that cuts off a gas supply at the time of occurrence of an abnormality, the gas meter including:

a flow detection unit that measures a gas flow quantity;

a flow computing unit that computes a flow quantity value from a detected value of the flow detection unit;

an average flow computing unit that obtains an average flow quantity value by averaging instantaneous flow quantity values computed by the flow computing unit;

a flow memory unit that stores the average flow quantity value obtained by the average flow computing unit;

a flow change determination unit that determines presence of a flow change when a difference between the value obtained by the average flow computing unit and a value stored in the flow memory unit is larger than a preset first change value;

a flow registration unit that registers or deletes a flow quantity corresponding to the flow change when the flow change determination unit has determined presence of a change;

a registered flow determination unit that determines whether or not a flow quantity registered after processing of changing a registered flow quantity is normal; and a registered flow correction unit that corrects the registered flow quantity so as to become close to the average flow quantity value by use of a difference flow quantity when an abnormality is in the flow quantity registered after the processing of changing.

3. A gas cutoff apparatus that monitors operating conditions of a plurality of gas appliances connected to portions of a pipe extending from a gas meter and that cuts off a gas supply at the time of occurrence of an abnormality, the gas meter including:

a flow detection unit that measures a gas flow quantity;

a flow computing unit that computes a flow quantity value from a detected value of the flow detection unit;

an average flow computing unit that obtains an average flow quantity value by averaging instantaneous flow quantity values computed by the flow computing unit;

a flow memory unit that stores the average flow quantity value obtained by the average flow computing unit;

a flow change determination unit that determines presence of a flow change when a difference between the value obtained by the average flow computing unit and a value stored in the flow memory unit is larger than a preset first change value;

a change direction determination unit that outputs a registration signal or a deletion signal in accordance with a direction of a change when the flow change determination unit determines presence of a change;

a flow registration unit that registers a flow quantity corresponding to the flow change when an output from the change direction determination unit is an incremental change and that deletes a registered flow quantity close to a flow quantity corresponding to the flow change when the output is a decremental change;

a registered flow determination unit that performs processing for subtracting the value obtained by the average flow computing unit from a value of a total flow quantity of the flow registration unit when the flow registration unit has performed deletion processing and that outputs an abnormality signal when there is a difference of predetermined level or more;

a flow difference correction estimation unit that makes a correction to a value registered in the flow registration unit by use of the difference flow quantity upon receipt of the abnormality signal from the registered flow determination unit;

a monitoring value memory unit that memorizes a determination value for monitoring an abnormality in an operating state;

an abnormality determination unit that compares the flow quantity value in the flow registration unit with a corresponding determination value in the monitoring value memory unit, thereby determining presence or absence of an abnormality; and a cutoff unit that cuts off a gas supply when the abnormality determination unit has made an abnormality determination.

4. A gas cutoff apparatus that monitors operating conditions of a plurality of gas appliances connected to portions of a pipe extending from a gas meter and that cuts off a gas supply at the time of occurrence of an abnormality, the gas meter including:

a flow detection unit that measures a gas flow quantity;

a flow computing unit that computes a flow quantity value from a detected value of the flow detection unit;

an average flow computing unit obtains an average flow quantity value by averaging, at each predetermined time, instantaneous flow quantity values computed by the flow computing unit;

an average time clock unit that counts an averaging time; a flow memory unit that stores the average flow quantity value obtained by the average flow computing unit; a flow change determination unit that determines presence of a flow change when a difference between the value obtained by the average flow computing unit and a value stored in the flow memory unit is larger than a preset first change value;

a flow registration unit that registers or deletes a flow quantity corresponding to the flow change in accordance with a direction of the change when the flow change determination unit determines that a change is present;

a registered flow correction unit that makes a correction to a flow quantity value in the flow registration unit when a difference between a value obtained by the average flow computing unit and the value registered in the flow registration unit is smaller than the first change value and greater than a second change value;

a monitoring value memory unit that memorizes a determination value for monitoring an abnormality in an operating state;

an abnormality determination unit that compares the flow quantity value in the flow registration unit with a corresponding determination value in the monitoring value memory unit, thereby determining presence or absence of an abnormality; and a cutoff unit that cuts off a gas supply when the abnormality determination unit has made an abnormality determination.

5. The gas cutoff apparatus according to claim 4, further comprising: a change value determination unit which compares an average flow quantity value obtained by the average flow computing unit with a sum of flow quantities registered in the flow registration unit in synchronism with a countup signal of the average time clock unit and which outputs a correction signal to the registered flow correction unit when a change of predetermined level or more is detected.

6. A gas cutoff apparatus that monitors operating conditions of a plurality of gas appliances connected to portions of a pipe extending from a gas meter and that cuts off a gas supply at the time of occurrence of an abnormality, the gas meter including:

a flow detection unit that measures a gas flow quantity;

a flow computing unit that computes a flow quantity value from a detected value of the flow detection unit;

an average flow computing unit obtains an average flow quantity value by averaging, at each predetermined time, instantaneous flow quantity values computed by the flow computing unit; an average time clock unit that counts an averaging time;

a flow memory unit that stores the average flow quantity value obtained by the average flow computing unit;

a flow change determination unit that determines presence of a flow change when a difference between the value obtained by the average flow computing unit and a value stored in the flow memory unit is larger than a preset first change value;

a flow registration unit that registers or deletes a flow quantity corresponding to the flow change in accordance with a direction of the change when the flow change determination unit determines that a change is present;

a registered flow correction unit that makes a correction to a flow quantity value in the flow registration unit when a difference between a value obtained by the average flow computing unit and the recorded value in the flow memory unit is smaller than the first change value and larger than a second change value;

a monitoring value memory unit that memorizes a determination value for monitoring an abnormality in an operating state;

an abnormality determination unit that compares the flow quantity value in the flow registration unit with a corresponding determination value in the monitoring value memory unit, thereby determining presence or absence of an abnormality; and a cutoff unit that cuts off a gas supply when the abnormality determination unit has made an abnormality determination.

7. The gas cutoff apparatus according to claim 6, further comprising a change value determination unit which compares an average flow quantity value obtained by the average flow computing unit with a value stored in the flow memory unit in synchronism with a countup signal of the average time clock unit and which outputs a correction signal to the registered flow correction unit when a change of predetermined level or more is detected.

8. The gas cutoff apparatus according to claim 6, further comprising a change value determination unit which compares an average flow quantity value obtained by the average flow computing unit with a value stored in the flow memory unit in synchronism with a countup signal of the average time clock unit;

a change value memory unit that stores in time sequence a result of comparison made by the change value determination unit; and a cumulative change determination unit that outputs, as a correction signal, the change value to the registered flow correction unit when an integrated value of change values stored in the change value memory unit has exceeded predetermined value.

9. The gas cutoff apparatus according to claim 8, wherein a change value in the change value memory unit is deleted when the registered flow correction unit has performed operation for correcting a flow quantity value.

* * * * *